(12) United States Patent
Masitise

(10) Patent No.: US 12,435,748 B2
(45) Date of Patent: Oct. 7, 2025

(54) NUT ARRANGEMENT, ROCK BOLT AND DRIVER APPARATUS

(71) Applicant: Mohlalefi (Pty) Ltd., Sandton (ZA)

(72) Inventor: Martin Nare Masitise, Sandton (ZA)

(73) Assignee: Mohlalefi (Pty) Ltd., Sandton (ZA)

( * ) Notice: Subject to any disclaimer, the term of this patent is extended or adjusted under 35 U.S.C. 154(b) by 0 days.

(21) Appl. No.: 17/922,717

(22) PCT Filed: Apr. 30, 2021

(86) PCT No.: PCT/IB2021/053631
§ 371 (c)(1),
(2) Date: Nov. 1, 2022

(87) PCT Pub. No.: WO2021/220240
PCT Pub. Date: Nov. 4, 2021

(65) Prior Publication Data
US 2023/0358265 A1    Nov. 9, 2023

(30) Foreign Application Priority Data

May 1, 2020    (GB) .................................. 2006483
Nov. 30, 2020  (ZA) .................................. 2020/07430

(51) Int. Cl.
F16B 31/02     (2006.01)
B25B 13/48     (2006.01)
F16B 39/16     (2006.01)

(52) U.S. Cl.
CPC ............ F16B 31/021 (2013.01); F16B 39/16 (2013.01); B25B 13/488 (2013.01)

(58) Field of Classification Search
CPC .................................. B25B 13/488; B23P 19/06
See application file for complete search history.

(56) References Cited

U.S. PATENT DOCUMENTS 1,343,667 A * 6/1920 Evensen ............... B25B 21/001
                                                    29/238
2,275,633 A    3/1942 Keiser
(Continued)

FOREIGN PATENT DOCUMENTS

CN      110985516 A      4/2020
DE    102008034811 A1    1/2010
(Continued)

OTHER PUBLICATIONS

International Search Report and Written Opinion for PCT/IB2021/053621, dated Sep. 27, 2021 (12 pages).
(Continued)

*Primary Examiner* — David B. Thomas
(74) *Attorney, Agent, or Firm* — Quarles & Brady LLP

(57) ABSTRACT

A shear nut 10, a lock nut 62 (together forming a nut arrangement 60 for a bolt 12), and a driver (110, 500, 600, 700) used while installing the nut arrangement 60. Particularly, the bolt 12 is a rock bolt. The shear nut 10 comprises first and second portions (14, 18) connected by a connecting portion 22. The second portion 18 comprises an engaging formation 20 configured to interact with the bolt 12 to limit the extent to which the second portion 18 operatively advances axially along the bolt 12. The first portion 14 has an internal thread. In use, the first and second portions (14, 18) are configured to become separated at the connecting portion 22, when the engaging formation 20 interacts with the bolt 12 and a predetermined moment is applied to the first portion 14.

8 Claims, 24 Drawing Sheets

(56) References Cited

U.S. PATENT DOCUMENTS

| | | | | |
|---|---|---|---|---|
| 2,479,225 | A | * | 8/1949 | Charles ................. B25B 13/488 475/270 |
| 2,645,965 | A | | 7/1953 | Resch |
| 3,191,486 | A | | 6/1965 | Gibbens |
| 4,904,122 | A | | 2/1990 | Herbst |
| 5,123,308 | A | * | 6/1992 | Shaffer ................. B25B 13/488 81/56 |
| 5,161,437 | A | * | 11/1992 | Yasutomi ............... B25B 13/488 81/57.3 |
| 5,544,991 | A | | 8/1996 | Richardson |
| 5,927,917 | A | | 7/1999 | Gibbons |
| 8,220,365 | B2 | * | 7/2012 | Yang ....................... B25B 17/02 81/55 |
| 8,225,698 | B2 | * | 7/2012 | Yang ....................... B25B 17/02 81/55 |
| 8,225,699 | B2 | * | 7/2012 | Yang ....................... F16B 23/00 81/55 |
| 9,427,853 | B1 | * | 8/2016 | Brodhead ............. B25B 21/002 |
| 10,150,207 | B2 | * | 12/2018 | Roberts ................. B25B 13/488 |
| 10,493,603 | B2 | * | 12/2019 | Dekam ................... B25B 17/00 |
| 2007/0251359 | A1 | | 11/2007 | Junkers et al. |
| 2011/0017880 | A1 | | 1/2011 | Osborn |
| 2011/0036208 | A1 | | 2/2011 | Yang |
| 2015/0226248 | A1 | | 8/2015 | Robertson, Jr. |
| 2017/0361431 | A1 | | 12/2017 | Dekam |

FOREIGN PATENT DOCUMENTS

| | | |
|---|---|---|
| DE | 102010030051 A1 | 12/2011 |
| FR | 2975741 B3 | 5/2013 |
| GB | 2230218 A | 5/1990 |

OTHER PUBLICATIONS

African Regional Intellectual Property Organization (ARIPO), Search Report for corresponding Application No. AP/P/2022/014528, issued Oct. 24, 2024.

* cited by examiner

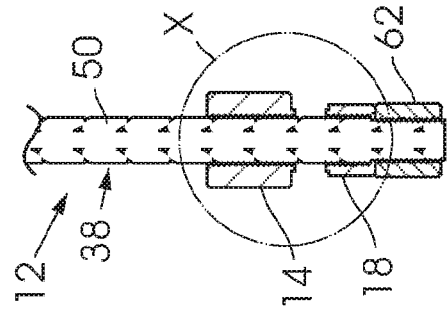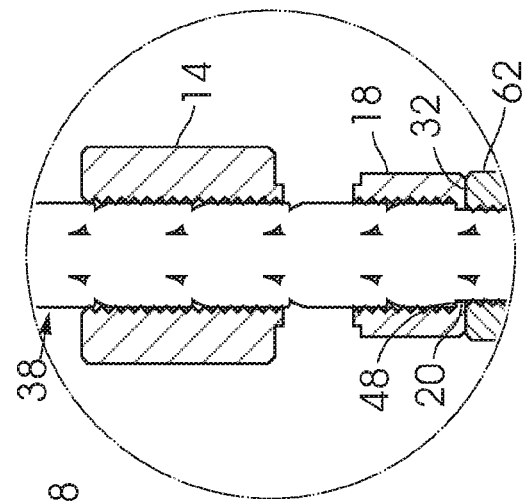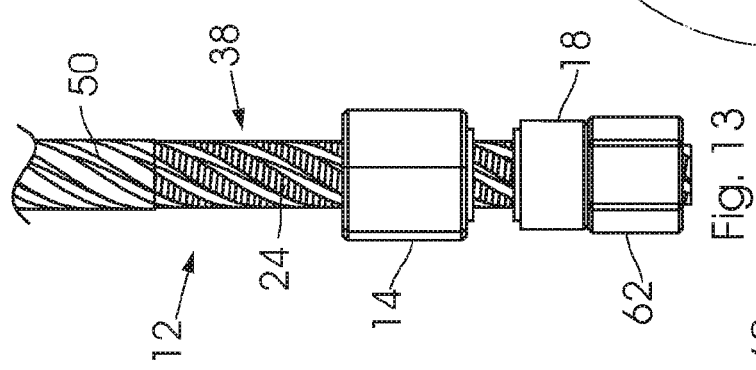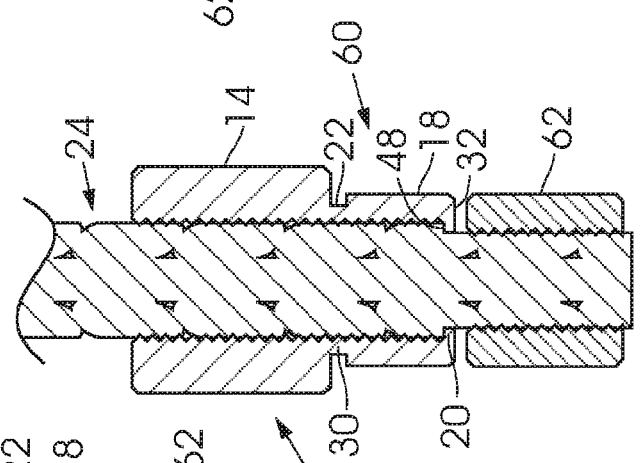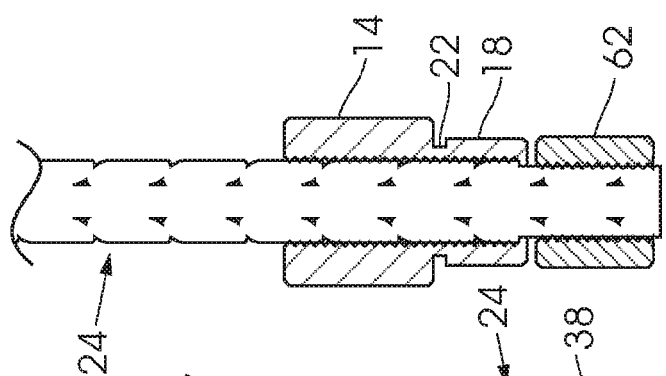

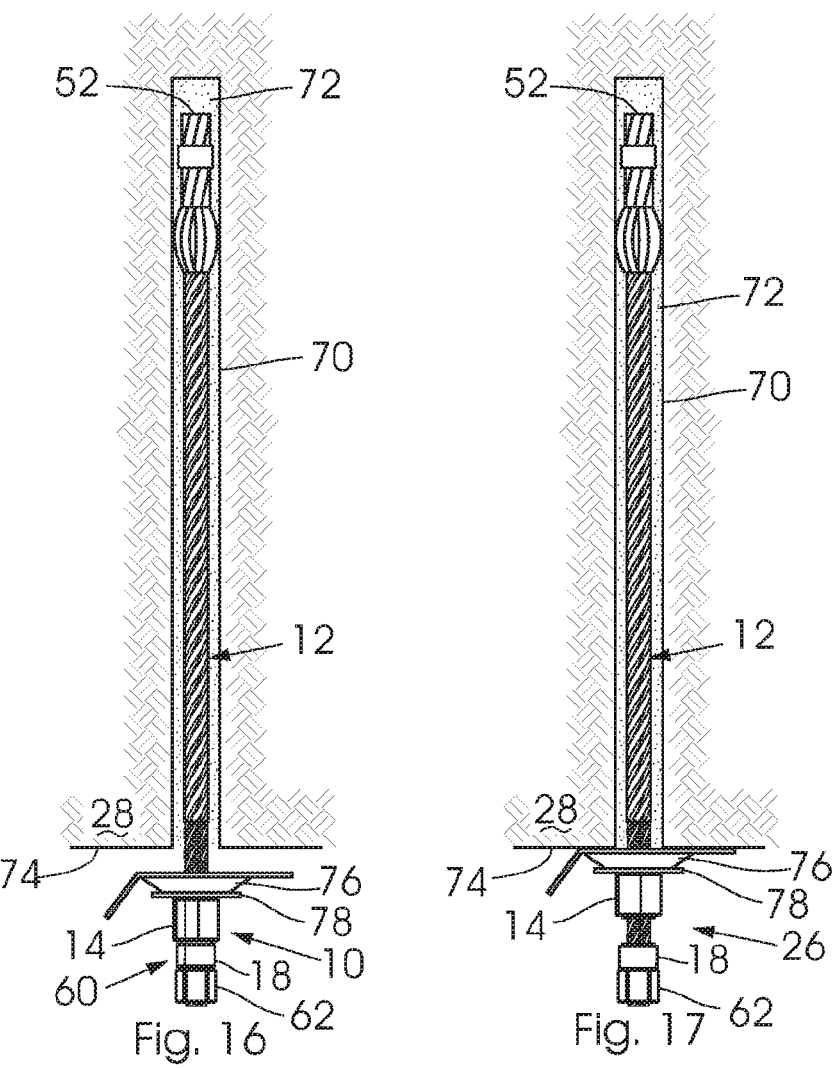
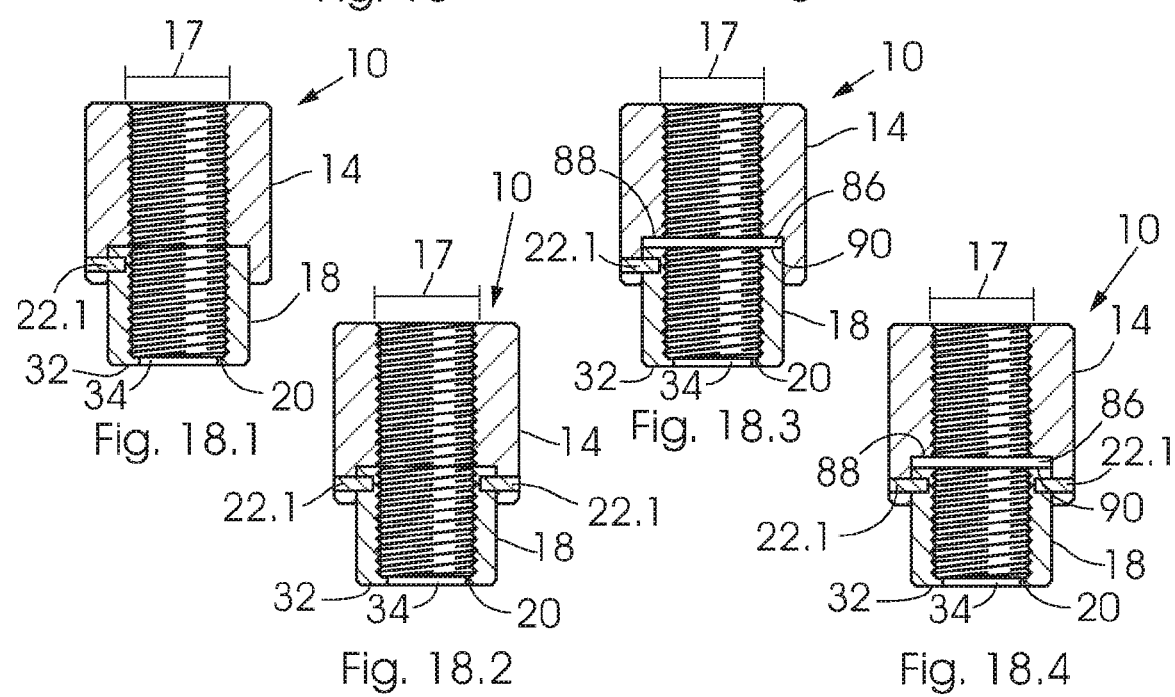

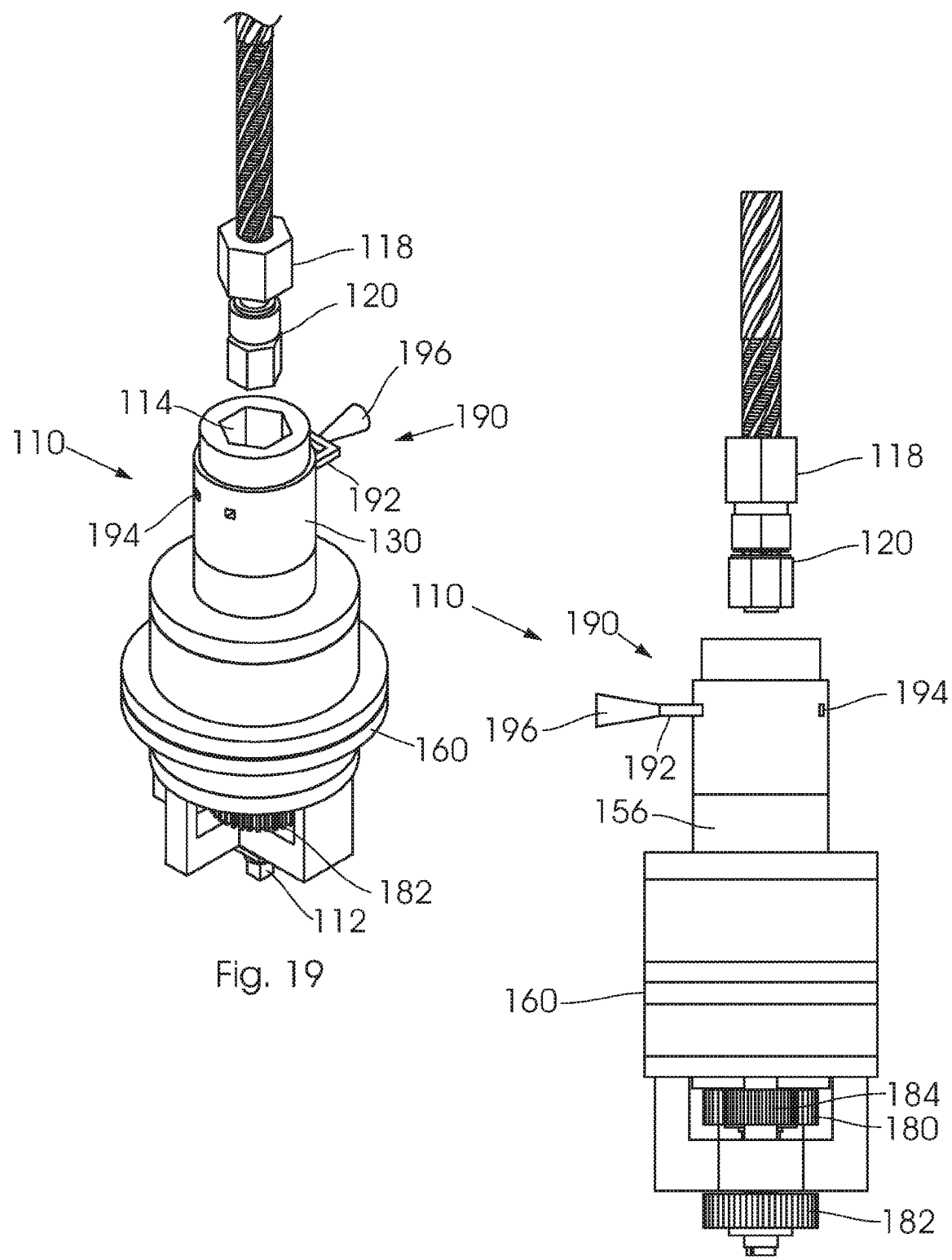

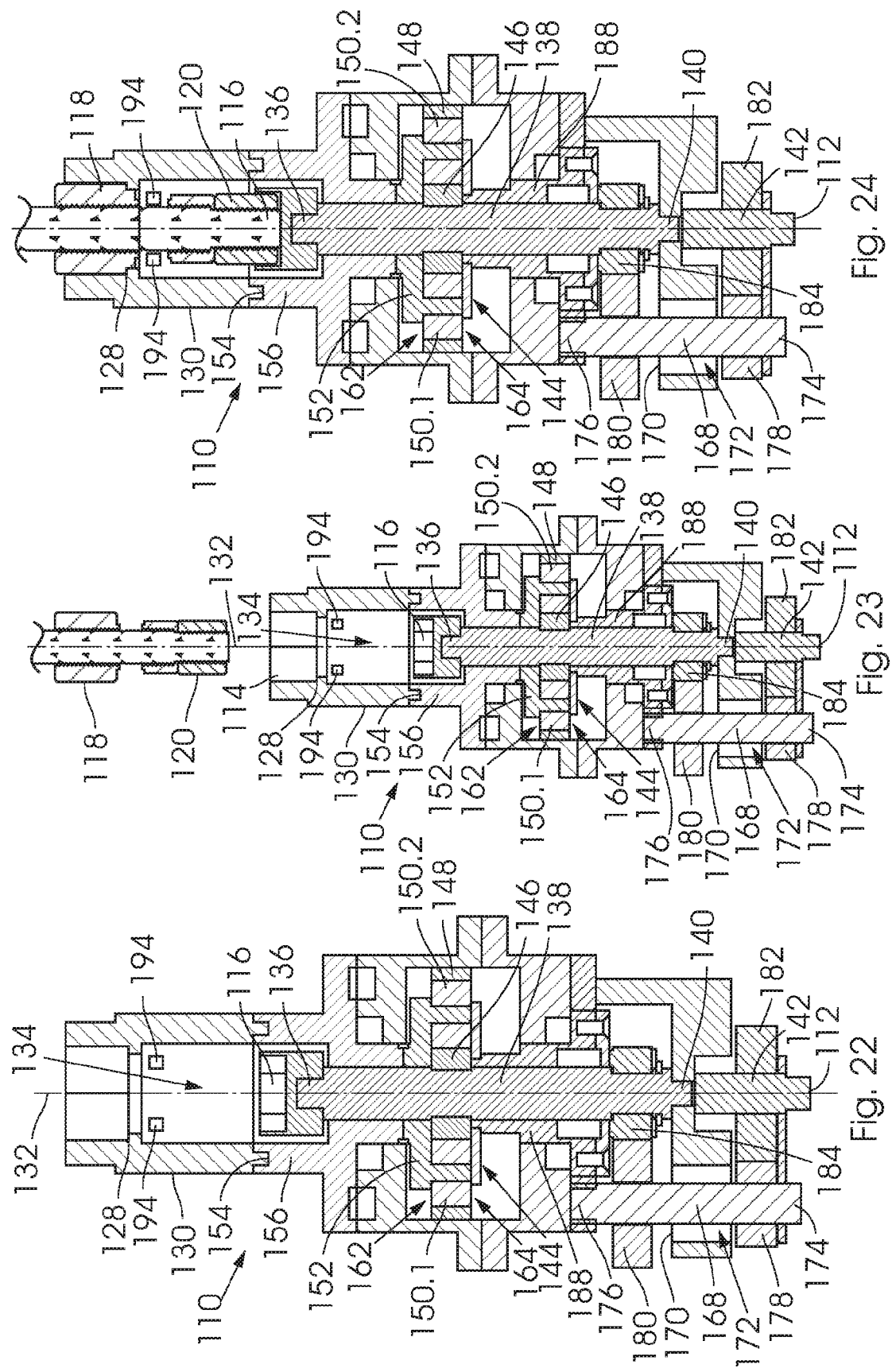

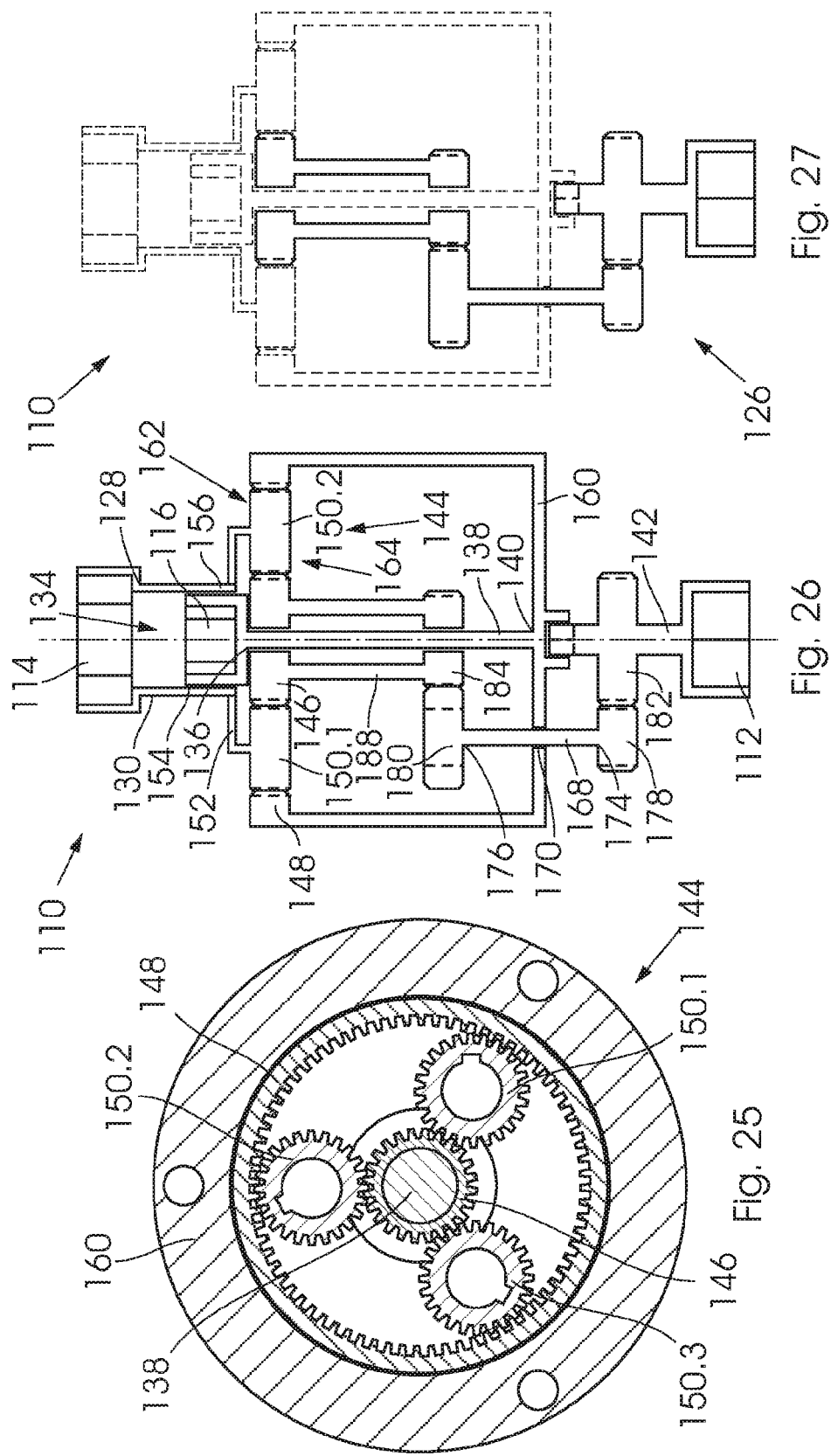

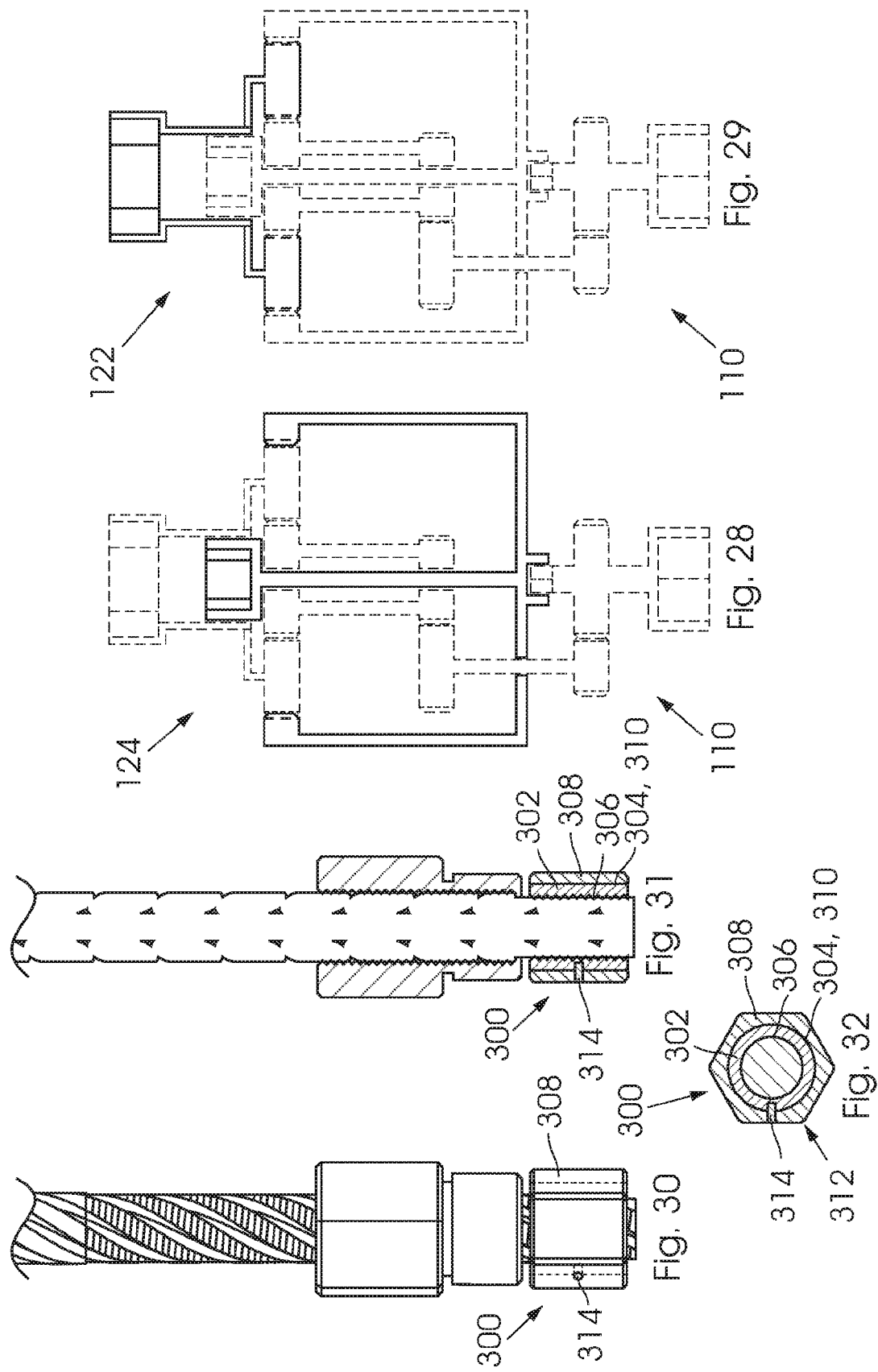

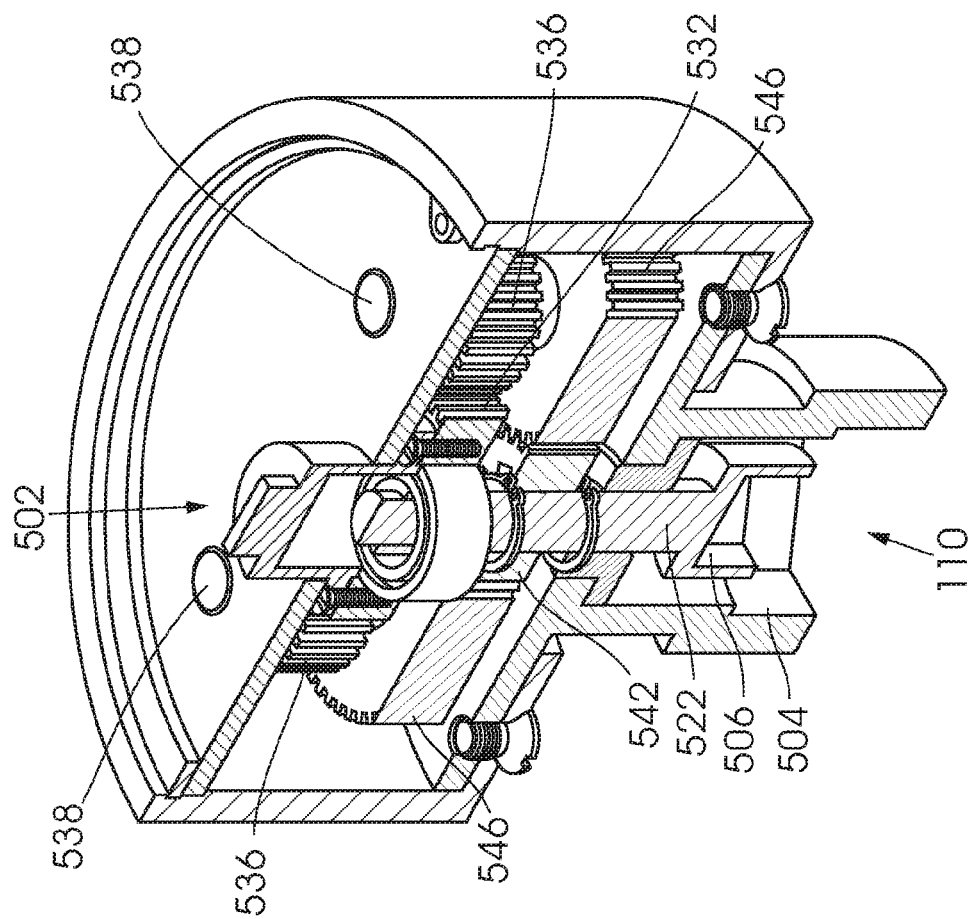
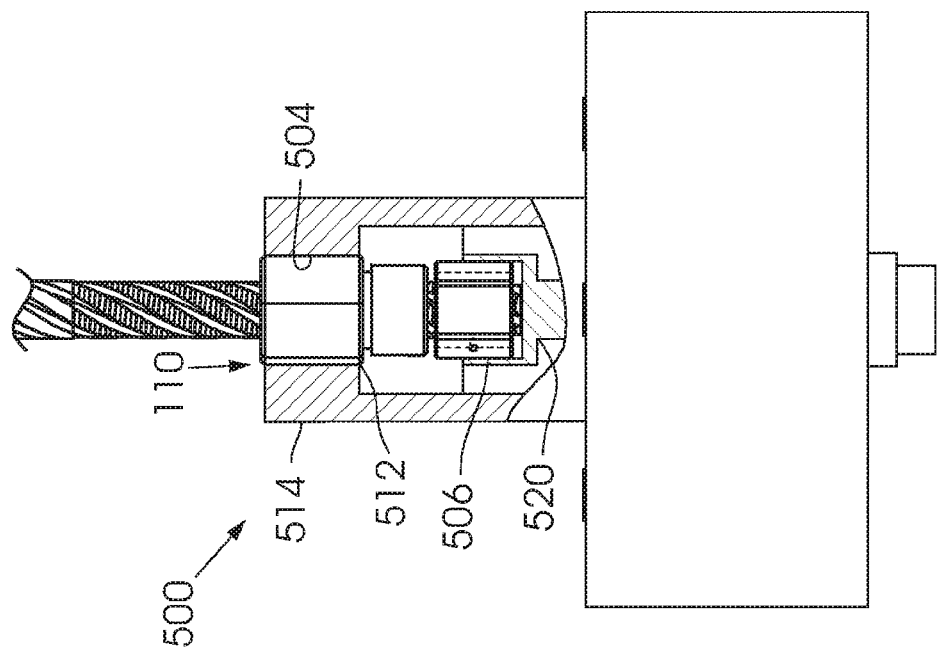

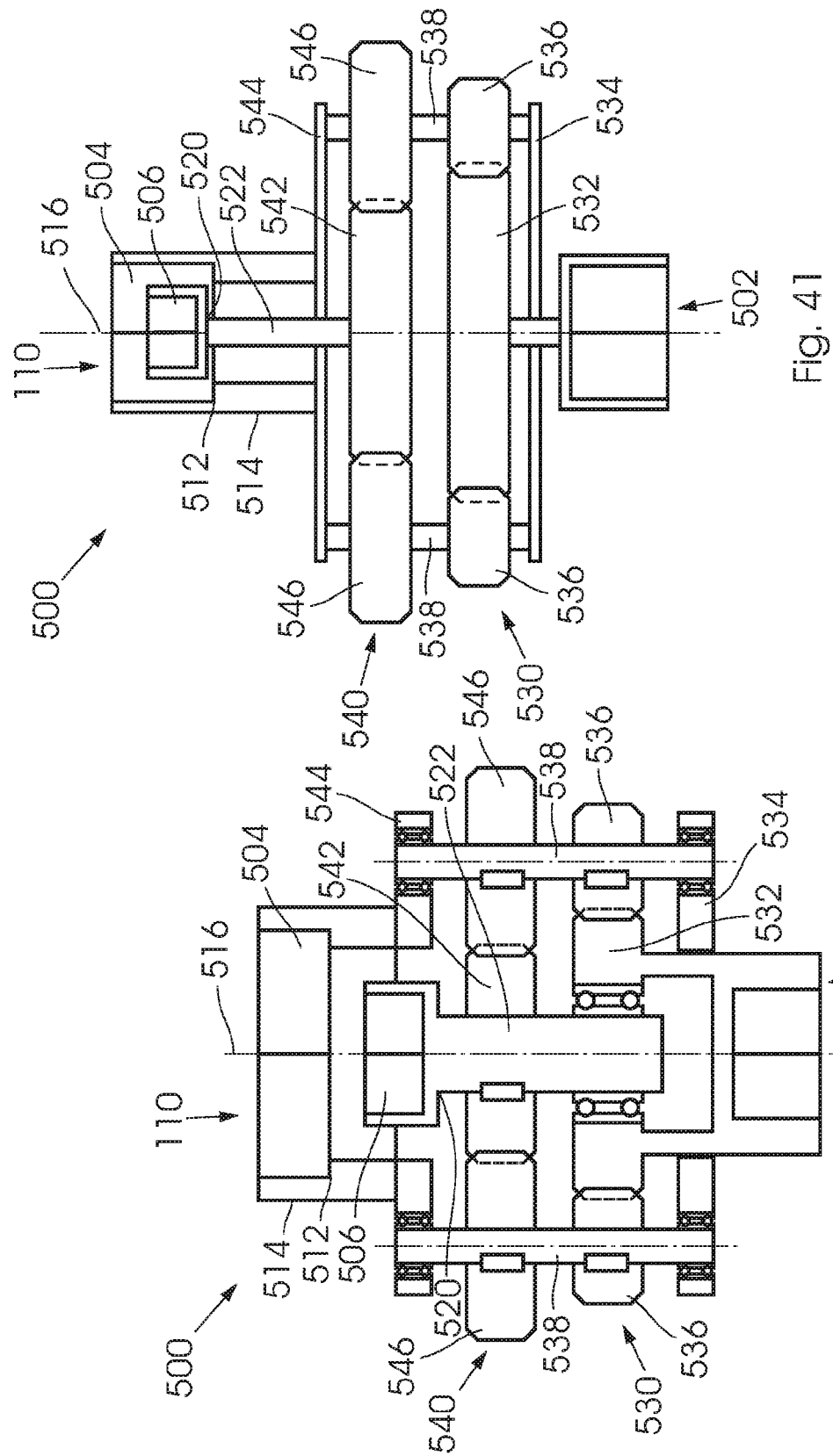

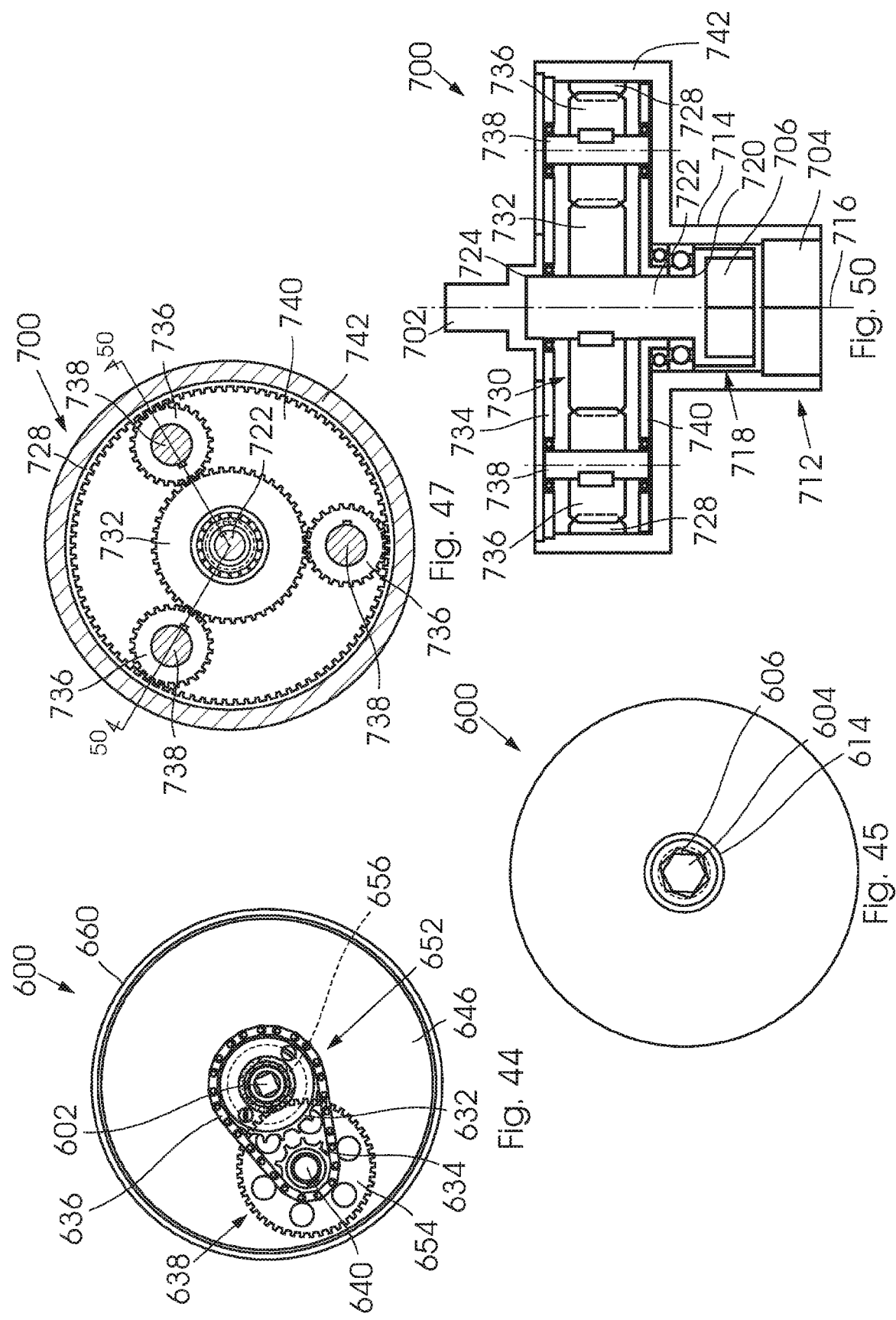

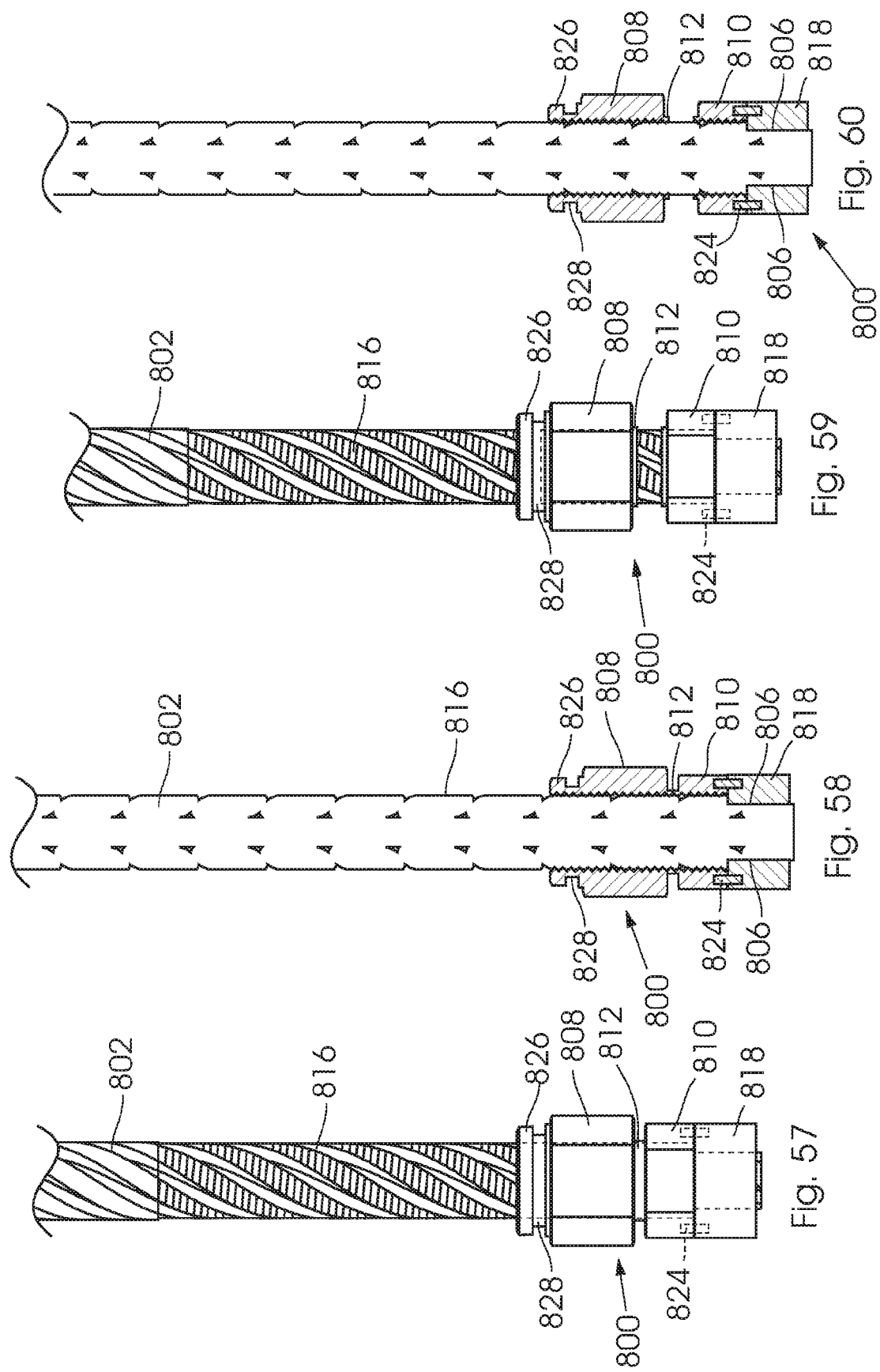

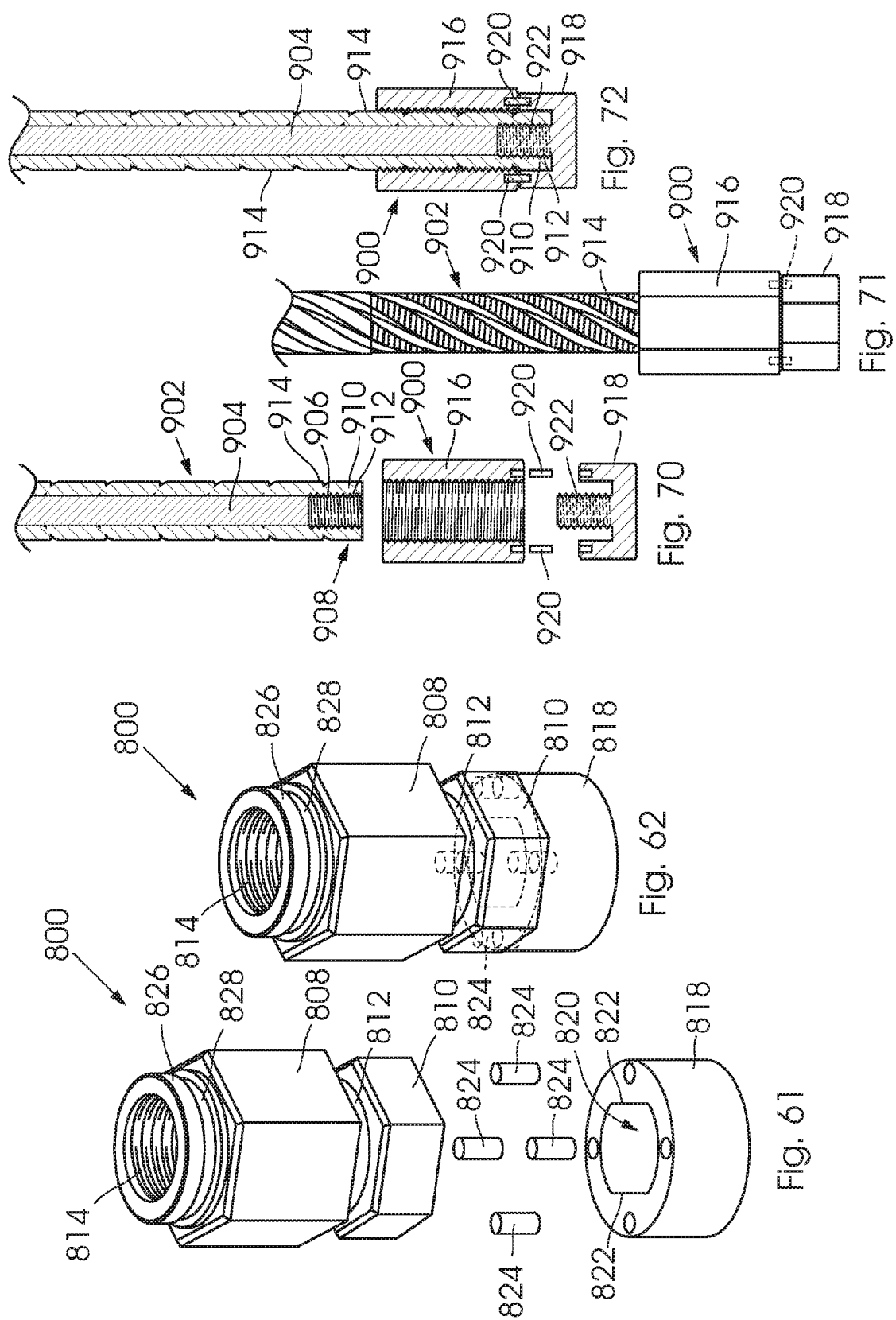

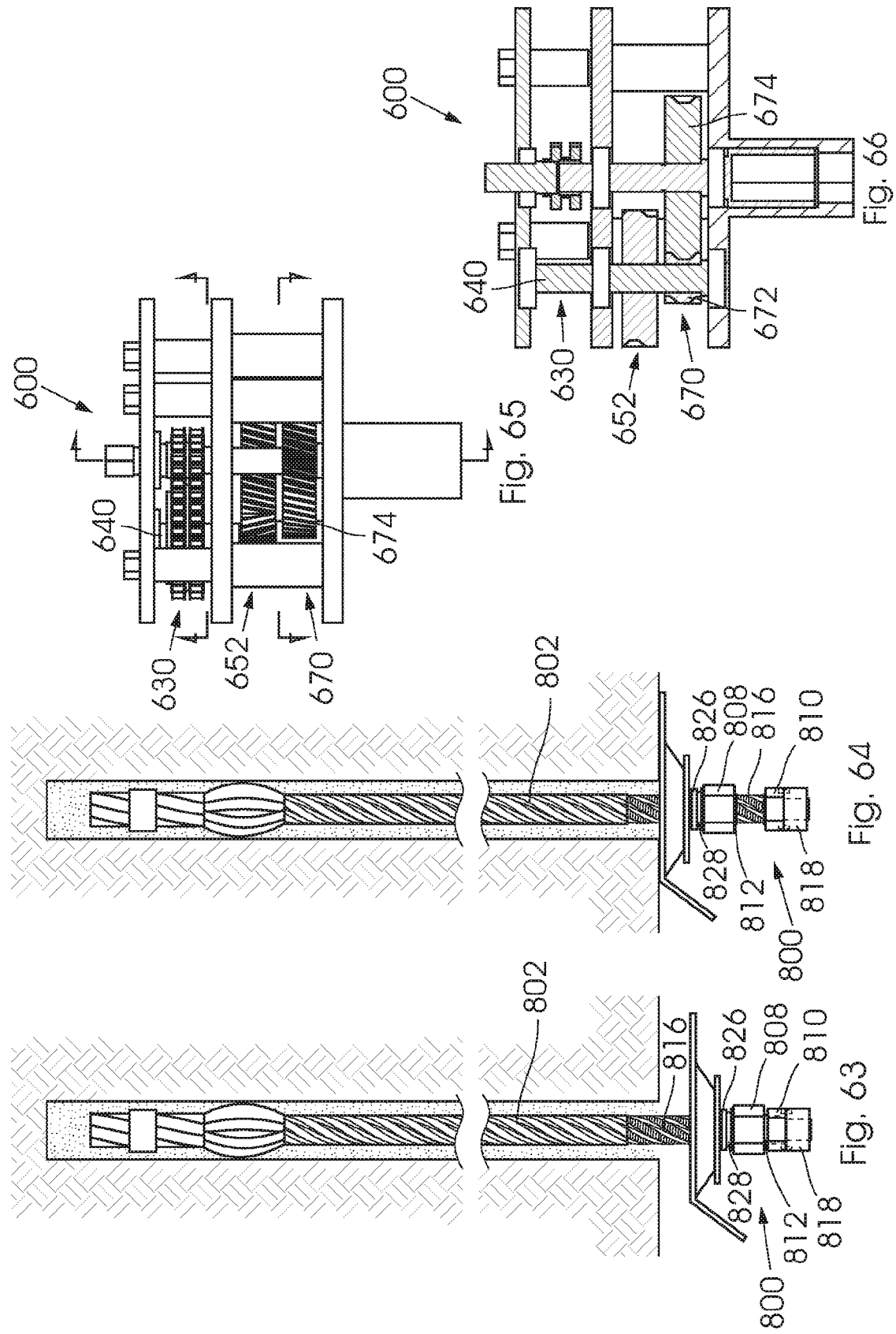

NUT ARRANGEMENT, ROCK BOLT AND DRIVER APPARATUS

BACKGROUND TO THE INVENTION

This invention relates to a shear nut, a nut arrangement for a bolt and a bolt including said nut arrangement. Particularly, but not exclusively, the invention relates to a shear nut which, together with a lock nut forms the nut arrangement for use with a bolt, typically, in the form of a rock bolt used as a mining roof bolt. The invention also relates to a bolt including said nut arrangement. Furthermore, the invention relates to a driver apparatus, and in particular to a driver apparatus with internal means for creating a counter moment when tightening or loosening a part such as a bolt or a nut. This application claims priority from GB 2006483.8 filed on 1 May 2020 and ZA 2020/07430 filed on 30 Nov. 2020, the full content of both being incorporated herein in its entirety as if reproduced herein.

Rock bolts are commonly used for the stabilising or strengthening of rock, typically, rock surrounding underground excavations such as rock faces or hanging walls in mines, or behind free-standing rock surfaces, such as in road cuttings. When installing rock bolts, holes are drilled in the rock, the bolts are advanced into the holes, until only a part of an end portion of the bolt protrudes from the hole and fixed in position by grouting with resin or cementitious fillers, by friction between the bolt and the rock walls of the holes, or by a combination of grouting and friction. A part of a threaded end portion of the bolt protrudes from the hole when the bolt is fixed in position. A bearing plate is provided over the protruding part of the bolt, and fixed in position by means of a nut, which is tightened onto the end portion. The nut is tightened to result in a desired or predetermined tension within the bolt.

Some rock bolts are fixed in the holes by way of what is known as a spin-to-stall system. In such a system, resin is introduced into the hole, after which the roof bolt is inserted. The rock bolt is rotated within the hole, typically by rotating a nut located at an end of the bolt. This rotation serves to mix the resin within the hole. In order to effect the rotation of the bolt within the hole, the nut is prevented from rotating relative to the bolt by means of a shear pin. Once the resin has set a desired amount, the bolt is inhibited from further rotation relative to the hole, and so, the torque applied to the bolt increases. As soon as the torque reaches or exceeds a predetermined amount (known as a breakout torque), the shear pin is supposed to shear, allowing the nut to rotate relative to the bolt. The nut may now be tightened on the bolt, creating a desired tension in the bolt.

Rock bolts of this type suffer from known disadvantages, such as inconsistency in torque required to break the shear pin. The linear force exerted on the shear pin by the nut differs between bolts, and is highly dependent on the manufacturing of the roof bolt. In the case of a cable roof bolt, consistency in cutting is highly improbable due to heat generated during the coiling of the cable. Furthermore, it has been found that, after the nut has sheared, the grout has not necessarily set firmly enough to be able to resist the torque applied to the bolt through the nut, which torque is associated with creating a required tension in the nut (known as the tightening or tensioning torque). The resin's ability to resist a torque applied to the bolt, therefore limits the permissible axial tension of the bolt.

Torque multipliers are used to scale up or increase the torque exerted on a part such as a bolt or a nut that is being tightened or loosened. The torque multiplier therefore utilises a favourable gear ratio to scale-up an input torque provided to the torque multiplier. A torque multiplier typically has three points of contact. The first is with the part that is being tightened or loosened (in other words the output of the torque multiplier). The second is created where an input torque is provided to the torque multiplier. The input torque is typically provided by a hand-held tool such as a socket driver or wrench, or by a torqueing device such as an electric, pneumatic or hydraulic torqueing device. Thirdly, a stabilizer arm makes contact with a surrounding object. The stabilizer arm creates a counter-moment to the output moment that is being exerted on the object. In this way, a smooth tightening or loosening of the of the object is facilitated.

In some applications, such as when tightening a nut of a rock bolt to create tension in the rock bolt after being installed in a rock body, a moment is exerted on the nut, and the counter-moment is created by adhesion or friction between the rock bolt and the rock body in which it is installed. In such instances, the amount of torque, or the size of the tightening moment that can be applied to the nut, is limited by the adherence or friction between the rock bolt and the rock body, and so, the pretension achievable through the tightening of the nut of the rock bolt is limited. Furthermore, especially in underground mining operations, spatial constraints limit the permissible size of the torqueing device used to tighten nuts of roof bolts. Therefore, providing a stabilizer arm for attaching to external structures is not always feasible. Furthermore, setting up of such an apparatus is often overly time consuming.

Accordingly, it is an object of the invention to provide a shear nut, a nut arrangement, a lock nut, a rock bolt assembly including said nut arrangement and lock nut, a driver apparatus and a method of installing a rock bolt which will, at least partially, address the above disadvantages. It is a further object of the invention to provide a shear nut, a lock nut, a nut arrangement for a rock bolt assembly including said nut arrangement and lock nut, a driver apparatus and a method of installing a rock bolt which will represent useful alternatives to existing shear nuts, lock nuts, nut arrangements, rock bolt assemblies, driver arrangements and methods.

SUMMARY OF THE INVENTION

In accordance with a first aspect of the invention there is provided a shear nut for use with a bolt, a rock bolt or a roof bolt, the shear nut comprising:
- a first portion having an internal thread configured to engage a first threaded portion of the rock bolt;
- a second portion comprising an engaging formation configured, in use, to interact with the rock bolt so as to limit the extent to which the second portion operatively advances axially along the rock bolt; and
- a connecting portion connecting the first portion and the second portion, wherein, in use, the first and second portions are configured to become separated at the connecting portion, when the engaging formation interacts with the rock bolt and a predetermined moment or torque is applied to the first portion.

The first portion may be an operative leading portion whereas the second portion may be an operative trailing portion.

The connecting portion may be a shearing portion, and the first and second portions may become separated at the connecting portion, when the shearing portion operatively shears responsive to the predetermined moment applied to the first portion. The configuration may be such that when the engaging portion interacts with the rock bolt and the first and second portions are connected through the connecting portion, the shear nut may be inhibited from being rotated relative to the roof bolt. The configuration may be such that, once the first and second portions have become separated, the first portion may be allowed to rotate relative to the bolt, allowing the internal thread to cause the first portion to advance axially relative to the rock bolt.

The connecting portion may be a frangible portion. The connecting portion may constitute a weakened portion formed between the first and second portions. The connecting portion may have a wall thickness which may be smaller than a wall thickness of the first and/or the second portions.

The second portion may comprise a substantially cylindrical body. The second portion may furthermore comprise an internal thread along a portion of a length thereof. The connecting portion may comprise an internal thread. The internal thread of the first, second and connecting portions may constitute a continuous thread when the first and second portions are connected through the connecting portion.

An outer dimension, or an outer diameter, of the second portion may be smaller than an outer dimension of the first portion.

There is provided for the first portion to have an external gripping formation for facilitating interaction with a tool. The first portion may have a hexagonal, square or other suitable outer shape, and may be configured as a driving head.

There is provided for the first, second and connecting portions to be integrally formed.

The engaging formation may take the form of a shoulder formed towards an operative trailing end of the second portion. The shoulder may take the form of a substantially disc-shaped formation, with a hole through a central portion thereof. A diameter of the hole may be smaller than an outer diameter of the first threaded portion of the rock bolt.

The internal thread of the first portion may be configured in a first directional orientation.

Alternatively, the first and second portions may comprise separate bodies, while the connecting portion may take the form of a shear pin extending between the first and second bodies. The first portion may comprise a recess for receiving an operative leading end of the second portion. The thread of the first and second portions may be configured to align or be in phase when the first and second portions are interconnected by the pin.

In accordance with a second aspect of the invention, there is provided a lock nut, in use forming part of a nut arrangement for a bolt, the lock-nut comprising:
an inner portion having an inner diameter and an internal thread configured to engage a threaded portion of a rock bolt;
an outer portion, comprising:
an internal opening within which the inner portion is received in use;
an outer gripping formation for facilitating interaction with a tool, to facilitate the transfer of a moment to the outer portion; and
an interconnecting arrangement arranged to extend between the inner and outer portions for facilitating a transfer of a moment from the outer portion to the inner portion,
wherein the interconnecting arrangement is configured to shear when a predetermined moment is applied to the outer portion, whereafter the inner and outer portions are free to rotate relative to each other.

The interconnecting arrangement may comprise at least a first pin which, in use, extends through a first hole in the outer portion, into a first hole in the inner portion. The interconnecting arrangement may comprise two or more pins.

The outer gripping formation may have a hexagonal, square or other suitable outer shape, and may be configured as a driving head. At least the inner portion of the lock nut may remain in position relative to the rock bolt after the interconnecting arrangement has sheared.

In accordance with a third aspect of the invention there is provided a nut arrangement for use with a bolt, a rock bolt or a roof bolt, the nut arrangement comprising:
a first portion comprising a first external gripping formation, a first inner diameter and an internal thread having a first directional orientation and which is configured to engage a first threaded portion of the bolt in use; and
a second portion comprising a second gripping formation, the second portion being configurable in a locked configuration relative to the bolt, in use, wherein, when the second portion is configured in the locked configuration, rotation of the second portion relative to the bolt is inhibited, such that the second portion is utilised to create a counter-moment when applying a moment to the first portion.

The second portion may comprise a lock nut having a second inner diameter and an internal thread having a second directional orientation and which is configured to engage a second threaded portion of the bolt. In use, the first portion may at least partially be threaded along the first threaded portion of the bolt by being rotated in a first direction, and the lock nut may be threaded onto the second threaded portion of bolt by being rotated in a second direction, until further rotation of the lock nut is inhibited, thereby to configure the lock nut in the locked configuration The first portion may take the form of a first nut. The first nut may take the form of a shear nut in accordance with the first aspect of the invention.

The first and second directional orientations may be opposite directional orientations. In use, a tightening moment may be applied to the first portion of the first nut. The tightening moment and the counter or opposing moment may be opposite moments or moments in opposite directions, so that a net moment applied to the lock nut may be smaller than the larger one of the tightening and opposing moments. Preferably the net moment approaches zero.

The first inner diameter may exceed the second inner diameter. The configuration may be such that the first nut may be advanced axially over the second threaded portion of the rock bolt, without interference between the internal thread of the first nut and the second threaded portion of the rock bolt.

The lock nut may be a lock nut in accordance with the second aspect of the invention.

The lock nut may have an external gripping formation for facilitating interaction with a tool. The external gripping formation of the lock nut may have a hexagonal, square or other suitable outer shape, and may be configured as a driving head. Alternatively, the lock nut may have a recess with an internal gripping formation having a hexagonal, square or other suitable shape, to receive a tool such as an Allen key.

The size or outer dimension of the driving head of the second portion or lock nut may be smaller than the size or outer dimension of the driving head of the first portion. The size of the driving head of the lock nut may be such that a driving tool or socket used for exerting a moment on the first nut may pass over the driving head of the lock nut without interference.

Further in accordance with the third aspect of the invention, the second portion may comprise an internal thread having a first directional orientation, and wherein the first and second portions may be interconnected via a connecting portion. The nut arrangement may furthermore include a locking portion provided for interacting with the second portion, to configure the second portion in the locked configuration. In use, the first and second portions may be configured to become separated at the connecting portion, when the second portion is configured in the locked configuration and a predetermined moment is applied to the first portion.

The second portion may act as a lock nut after the separation of the first and second portions. The locking portion may comprise a ring portion with an engaging surface provided for interacting with the bolt, such that relative rotation between the ring portion and the rock bolt is inhibited thereby.

A connection arrangement may be provided between the locking portion and the second portion to configure the second portion in the locked configuration. The connection arrangement may comprise at least one pin. The pin may, in use, extend between the locking portion and the second portion and may inhibit rotation of the second portion relative to the locking portion. The locking portion may comprise a non-circular hole there through, and shaped to engage a correspondingly shaped non-circular portion of the bolt.

The first portion may be provided with a load indicator. The load indicator may comprise a contact portion, connected to the first portion via a second connection arrangement. The second connection arrangement may be configured to collapse when a predetermined axial force is applied thereto.

Alternatively, the second portion may be separate from the first portion, and the second portion may comprise a protruding portion with an external thread having a second directional orientation. The protruding portion may be configured for being received in a blind centre opening of the bolt. The second portion may be configured in the locked configuration when, in use, interaction with the bolt inhibits the second portion from advancing further along a length of the bolt. The first and second portions may, in use, interconnected by at least a first shear pin, and typically, by more than one shear pin.

In accordance with a fourth aspect of the invention there is provided a bolt, a rock bolt or a roof bolt having a first end region comprising:
 a first body portion, having a first diameter and a first threaded portion having a first directional orientation, the first threaded portion formed towards a first end of the first body portion;
 a second body portion having a second diameter which is smaller than the first diameter, the second body portion extending axially away from the first end of the first body portion, and having a cross-sectional dimension which is smaller than the first diameter.

The second body may have a second diameter and may comprise a second threaded portion having a second directional orientation.

Alternatively, the second portion may be non-circular in cross-section, and may include at least a first cut-out which may define a first substantially planar surface. The second portion may include a second cut-out defining a second substantially planar surface, which may extend substantially parallel to the first.

In use, the first end region of the rock bolt may be provided with a nut arrangement in accordance with the third aspect of the invention. The first nut of the nut arrangement may at least partially be received on the first body portion, and the lock nut of the nut arrangement may be received at least partially on the second body portion. The lock nut may be provided for creating a counter-moment when exerting a moment on the first nut in order to tighten the first nut.

A shoulder formation may be formed at a transition between the first and second body portions of the rock bolt.

The rock bolt may comprise a main body portion, extending away from the first end region. The main body portion may terminate in a second end. The main body portion may be of the known kind.

The main body may comprise a cable. The first and a second end region may be reinforced by welding, which may be done by:
 pulling a king wire or strand of the cable axially from the cable, such that a length of the king wire is exposed;
 cutting a portion of the king wire to shorten the king wire;
 pushing the king wire axially back into position within the cable, such that the king wire is substantially centred axially within the cable; and
 welding inner surfaces of the openings formed at the ends thereby to reinforce the strands of the cable.

In an alternative embodiment, an expansion unit may be provided towards the second end of the rock bolt, for expanding within, and gripping to, an internal surface of the hole.

In an alternative embodiment, the bolt may have a first end region comprising:
 a first body portion, having a first diameter and a first threaded portion having a first directional orientation, the first threaded portion formed towards a first end of the first body portion; and
 an internal blind hole defining a second diameter, and comprising an internal thread having a second directional orientation.

The bolt may comprise a cable bolt, while the internal blind hole may be created by pushing a king strand or wire axially deeper into the body of the cable. An inner surface of the internal blind hole may be welded before the internal thread is formed.

In accordance with a fifth aspect of the invention, there is provided a method of installing a roof bolt, the method including the steps of:
 creating a hole extending into a rock body;
 inserting a rock bolt in accordance with the fourth aspect of the invention into the hole, so that at least a part of the first end region protrudes out of the hole and beyond a face of the rock body;
 providing a first portion of a nut arrangement at least partially on a first body portion of the first end region of the rock bolt;
 configuring a second portion of the nut arrangement in a locked configuration;
 exerting a tightening moment on the first portion; and
 exerting a counter-moment on the lock nut.

The method may include the step of fixing the rock bolt within the hole, which may comprise the steps of:

providing a resin within the hole;
exerting a setting moment below a predetermined moment on the first portion, which first portion comprises a first portion of a shear nut in accordance with the first aspect of the invention or of the nut arrangement in accordance with the third aspect of the invention; and
exerting a shearing moment which exceeds the predetermined moment, to cause a first portion of the shear nut to become separated from a second portion of the shear nut.

The setting moment may cause the rock bolt to rotate relative to the hole. The resin may be a two-part resin. The rotation of the rock bolt relative to the hole may cause the resin to become mixed. The mixing of the resin may cause the resin to become set, inhibiting further rotation of the rock bolt.

The resin may be injected in the hole before inserting the rock bolt into the hole. Alternatively, the rock bolt may be configured to allow the resin to be injected into the hole, through the rock bolt, and the resin may be injected into the hole through the rock bolt, after the rock bolt has been inserted into the hole.

The method of installing the rock bolt may include the step of providing a bearing plate over the first end region of the rock bolt between the rock body and the first nut.

The method may include tightening the first nut by exerting the tightening moment on the first nut and exerting the counter moment on the lock nut, until a predetermined counter moment is exerted on the lock nut, causing the interconnecting arrangement of the lock nut to shear, allowing the inner and outer bodies of the lock nut to rotate relative to each other, thereby preventing further tightening of the first nut.

The predetermined counter moment associated with the shearing of the interconnecting arrangement may be determined based on a required pretension of the rock bolt.

In accordance with a sixth aspect of the invention there is provided a driver apparatus, comprising:
an input formation through which an input moment or torque is supplied in use;
a first engagement formation provided for operatively engaging with a first object, the first engagement formation configured to transmit a first output moment or torque in a first direction to the first object; and
a second engagement formation provided for operatively engaging with a second object, the second engagement formation configured to transmit a second output moment or torque in a second direction to the second object,
wherein the first and second engagement formations are aligned axially on a common central axis and spaced axially.

The first engagement formation may be associated with a first drive arrangement, while the second engagement may be associated with a second drive arrangement. The input formation may be associated with an input drive arrangement. The first and second drive arrangements may be driven by the input drive arrangement. Interaction between the first, second and input drive arrangements may cause the first and second engagement formations operatively to be driven in opposite directions.

The first engagement formation may be fixed to or formed towards a first end of a first drive body. The second engagement formation may be fixed to or formed towards a first end of a second drive body. The first and second drive bodies may be arranged operatively to rotate about a common central axis, in opposite angular directions. The first drive body may comprise a substantially cylindrical structure, and may be hollow. The first engagement formation may constitute a first socket within which the first object may at least partially be received in use. The first socket may have a hexagonal, square or other suitable cross section. The first engagement formation may be open ended on two opposing sides. The second engagement formation may be arranged, at least partially within the first drive body. The second engagement formation may constitute a second socket within which the second object may at least partially be received in use. The second socket may have a hexagonal, square or other suitable cross section. Alternatively the second engagement formation may comprise an Allen key for engaging with a head of the second object or a driving head. The size of the hexagonal, square or other suitable cross section of the first socket may exceed the size of the hexagonal, square or other suitable cross section of the second socket. The arrangement may be such that the second object is, in use, received through the first engagement formation, and brought into engagement with the second engagement formation. The second drive body may constitute a central shaft. The second engagement formation may be located towards a first end of the central shaft. The central shaft may extend from the second engagement formation, in a direction away from the first engagement formation. The input formation may be fixed to or formed integrally with an input shaft. The input shaft may be aligned axially with the first and second engagement formations, and the input shaft may rotate about the common central axis. The input formation, and first and second engagement formation may therefore be arranged in axial alignment.

The driver apparatus may comprise at least a first carrier body and at least a first side shaft which is carried or supported by the first carrier body. The first side shaft may be spaced from and arranged substantially parallel to the central axis. The side shaft may in use, be driven directly or indirectly through the input formation. In use, a moment may be exerted on the first carrier body about the central axis, by the at least first side shaft when same is driven through the input formation.

The driver apparatus may furthermore comprise a planetary gear arrangement, comprising a sun gear and an outer ring gear and at least one planet gear, but typically two or more planet gears, spaced equidistantly between the sun gear on a pitch circle diameter (PCD). In some cases, the driver apparatus may include an outer ring gear. The sun and outer ring gears may be arranged concentrically. The planet gears may be interconnected by a planet carrier body. The sun gear, outer ring gear and planet carrier body may be arranged to rotate about the common central axis. The planetary gear arrangement may comprise three or more planet gears.

The first drive body may be fixed to the planet carrier body, through a first connecting body. The first engagement formation, first drive body and first connecting body may be arranged to rotate with the planet carrier body. The first drive arrangement may comprise the first engagement formation, the first drive body, the planet carrier body and the complement of planet gears. The second drive body may be received through the sun gear. The sun gear may be arranged to rotate freely on the second drive body. The sun gear may be fixed to the second drive body by means of a bearing. A second end of the second drive body may be fixed to a second connecting body. The second connecting body may be fixed to the outer ring gear. The outer ring gear, second connecting body, second drive body and second engagement formation may rotate together and may constitute the second drive arrangement. The input shaft may be fixed to the second connecting body so that relative displacement between the input shaft and the second connecting body is facilitated. The input shaft may be fixed to the second connecting body by means of a bearing.

The sun gear may form part of, and be driven via the input drive arrangement or input drivetrain. The input shaft may form part of the input drive arrangement. The input drive arrangement may furthermore comprise a side shaft, arranged parallel to, and spaced radially from, the common central axis. The side shaft may be held in position by the second connecting body, and may be arranged so that rotation relative to the second connecting body is facilitated. A bearing may be provided between the second connecting body and the side shaft. A first side shaft gear may be fixed to a first end of the side shaft, and may be driven through a first input gear, which may be fixed to the input shaft. A second side shaft gear may be fixed to a second end of the side shaft. The second side shaft gear may drive a central gear. The central gear may be held in position by the second drive body, which may be received through the central gear. The central gear may be arranged to allow relative rotation between the central gear and the second drive body. A bearing may be provided between the central gear and the second drive body. The central gear may rotate about the common central axis.

The central gear may be connected to the sun gear, through a third connecting body. The central gear, third connecting body and sun gear may therefore rotate together. The input drive arrangement may comprise of the input formation, the input shaft, the first input gear, the first side shaft gear, the side shaft, the second side shaft gear, the central gear, the third connecting body and the sun gear. The first, second and input drive arrangements may interact through the planetary gear arrangement. The input drive arrangement may interact with second drive arrangement through the side shaft's interaction with the second connecting body. The input formation may take the form of one of a socket and a driving head.

The driver apparatus may further comprise a retaining mechanism, configured releasably to retain the driver apparatus relative to the first and/or the second object. The retaining mechanism may comprise a latch body. The latch body may be received within a slot provided in the first drive body. The latch body may be displaceable within the slot between a latched and unlatched configuration. The latch body may comprise two prongs, each of which may be associated with a separate slot. The retaining mechanism may include a handle for displacing the latch body between the latched and unlatched configurations. In use, when the latch body is in the latched configuration, the latch body catches onto a surface of one of the first and second objects to retain the driver apparatus relative to said one of the first and second objects. The slot(s) may be formed through a side wall of the first drive body. The slots may be located between the first and second engagement formations, so that operatively, the latch body, when in the latched configuration, catches onto the second object received within the second socket.

Gear ratios of the first and/or second and/or input drive arrangements may facilitate a torque multiplication.

Alternatively, the driver apparatus may comprise a first planetary gear arrangement including a first sun gear, a first planet carrier, and a first planet gear. Typically, the first planetary gear arrangement may include two or more first planet gears, spaced equidistantly about the first sun gear on a pitch circle diameter (PCD). The first planet gears may be rotatably fixed to the first planet carrier, such that the first planet carrier may rotate relative to the first sun gear, causing the first planet gears to revolve around the first sun gear, in use.

The driver apparatus may comprise a second planetary gear arrangement including a second sun gear, a second planet carrier, and a second planet gear. Typically, the second planetary gear arrangement may include two or more second planet gears, spaced equidistantly about the second sun gear on a pitch circle diameter (PCD). The second planet gears may be rotatably fixed to the second planet carrier, such that the second planet carrier may rotate relative to the second sun gear, causing the second planet gears to revolve around the second sun gear, in use. The first and second sun gears may be concentrically aligned and axially spaced. Each first planet gear is associated with a planet shaft. The planet shaft of a particular first planet gear may also be associated with a specific one of the second planet gears. The first and second planet gears associated with a particular planet shaft, may be fixed to the particular planet shaft, such that the first and second planet gears and their particular planet shaft may rotate together, at the same rotational speed.

Each planet shaft extends from the first planet carrier, to the second planet carrier, and is rotatably fixed to each of the first and second planet carriers. The first and second planet carriers therefore rotate together, in use. The input formation may be fixed to the first sun gear. The first drive body may be fixed to, and may rotate with, the second planet carrier. The second drive body may be fixed to, and may rotate with, the second sun gear. The central shaft may extend through the first sun gear, and may rotate independently from the first sun gear.

Further alternatively, the driver apparatus may comprise a first transfer arrangement, such as a first chain and sprocket arrangement, comprising a first transfer member or sprocket, a second transfer member or sprocket and a chain linking the first and second sprockets. The first sprocket may be driven by the input formation. The second sprocket may form part of a first side-shaft arrangement, and may be fixed to a first side shaft.

The driver apparatus may furthermore comprise second transfer arrangement in the form of a first gear arrangement, comprising a third transfer member or first gear and a fourth transfer member or second gear, the first and second gears arranged in mesh. The first gear may form part of the first side-shaft arrangement, and may be fixed to the first side shaft. The second sprocket, first side shaft, and first gear may all rotate together, in use. The second gear may be fixed to the central shaft, and may rotate with the central shaft, in use. The first side shaft may be substantially parallel to the central axis.

The first side shaft may be supported by a carrier body which is arranged to be rotatable about the central axis. The first side shaft may be spaced from the central axis by a first distance, and may, in use, revolve around the central axis. In use, a path of a first axis of the first side shaft may describe a circle about the central axis, which circle may have a radius equal to the first distance. The first drive body may be fixed to the carrier body, and may, in use, rotate with the carrier body.

The first and second transfer members may comprise one of: i) first and second sprockets connected by a chain; ii) first and second pulleys connected by a belt; and iii) first and second gears provided in mesh, while the third and fourth transfer members may comprise one of: i) first and second gears provided in mesh; ii) first and second sprockets connected by a chain; iii) first and second pulleys connected by a belt.

The driver apparatus may furthermore comprise a second gear arrangement, comprising a third gear and a fourth gear, the third and fourth gears arranged in mesh. In this configuration, the second gear may be associated with and fixed to, a second side-shaft. The third gear may also be fixed to the second side-shaft. The second side-shaft may also be supported by the carrier body. The second gear arrangement may be provided to amplify torque output by the first and/or second engagement formations, and may facilitate a torque multiplication. The driver apparatus may furthermore comprise a third and/or further side shaft arrangements, and a third and/or further gear arrangements. The first and/or second engagement formation may be elongate, to allow the respective first and/or second object to be axially displaced relative thereto during tightening/loosening.

Yet further alternatively, the driver apparatus may comprise a planetary gear arrangement including a sun gear, a planet carrier constituting the carrier body, at least a first planet gear and an outer ring gear. Typically, the planetary gear arrangement may include two or more planet gears, spaced equidistantly about the first sun gear on a pitch circle diameter (PCD). The planet gears may be rotatably fixed to the planet carrier, such that the planet carrier may rotate relative to the sun gear, causing the planet gears to revolve around the sun gear, in use.

Each planet gear is associated with a planet shaft constituting the side shaft, which may extend from the first planet carrier. The input formation may be fixed to the first carrier body or planet carrier. The ring gear may be fixed to an outer body of the driver and may directly or indirectly, drive the first engagement formation in use. The first drive body may be fixed to, and may rotate with, the outer body of the driver, and therefore, the ring gear. The second drive body may be fixed to, and may rotate with, the sun gear.

BRIEF DESCRIPTION OF THE DRAWINGS

The invention will now be described in more detail, by way of example only, with reference to the accompanying drawings in which:

FIGS. 10-15 show various views of an assembly of the first end region of FIG. 9, the shear nut of FIG. 3 and the lock nut of FIG. 6, before and after first and second portions of the shear nut have been separated by a shear moment;

FIGS. 16-17 show a side view of an installation of a rock bolt of FIG. 1 in a rock body, the rock bolt provided with a bearing plate, a washer and a nut arrangement, before and after the first and second portions of the shear nut have been separated, and before and after the first portion has been tightened;

FIG. 18 shows sectioned views of four alternative embodiments of the shear nut of FIG. 3;

FIGS. 19-24 show various views of a driver apparatus in accordance with an aspect of the invention;

FIG. 25 shows a sectioned front view of through a planetary gear arrangement that forms part of the driver apparatus of FIG. 19;

FIG. 26 shows a schematic view of the driver apparatus of FIG. 19;

FIG. 27 shows a schematic view of the driver apparatus of FIG. 19, wherein an input drive arrangement of the driver apparatus is shown in solid lines;

FIG. 28 shows a schematic view of the driver apparatus of FIG. 19, wherein a second drive arrangement of the driver apparatus is shown in solid lines;

FIG. 29 shows a schematic view of the driver apparatus of FIG. 19, wherein a first drive arrangement of the driver apparatus is shown in solid lines;

FIGS. 30-32 show a side view, sectioned side view and sectioned bottom view of an assembly of the first end region of FIG. 9, the shear nut of FIG. 3 and a lock nut according to an alternative embodiment of the invention, before first and second portions of the shear nut have been separated by a shear moment;

FIGS. 33-37 shows various views of a driver apparatus according to an example embodiment of the invention;

FIG. 40 shows a schematic view of the driver apparatus of FIG. 33;

FIG. 41 shows a simplified schematic view of the driver apparatus of FIG. 33;

FIGS. 42-45 show various views of a driver apparatus according to a further example embodiment of the invention;

FIGS. 46-49 show various views of a driver apparatus in accordance with an alternative embodiment of the invention;

FIG. 50 shows a schematic side view of the driver of FIG. 46;

FIGS. 57-60 show various side views of an assembly of the nut arrangement of and the rock bolt of FIG. 54, before and after a connecting portion has been separated;

FIG. 61 shows an exploded perspective view of the nut arrangement of FIG. 54;

FIG. 62 shows an assembled perspective view of the nut arrangement of FIG. 54;

FIGS. 63-64 show sectioned side views in use, of the nut arrangement and rock bolt of FIG. 54, before and after the connecting portion has been separated;

FIGS. 65-69 show various views of an alternative embodiment of the driver of FIG. 42, which alternative embodiment comprises more than one gear arrangement;

FIG. 70 shows a sectioned exploded side view of an alternative embodiment of a nut arrangement and rock bolt, in accordance with an aspect of the invention;

FIG. 71 shows a side view of the nut arrangement of FIG. 70 in assembled form; and FIG. 72 shows a sectioned side view of the nut arrangement of FIG. 70 in assembled form.

DESCRIPTION OF THE ILLUSTRATED EMBODIMENTS

Figures 1, 2:
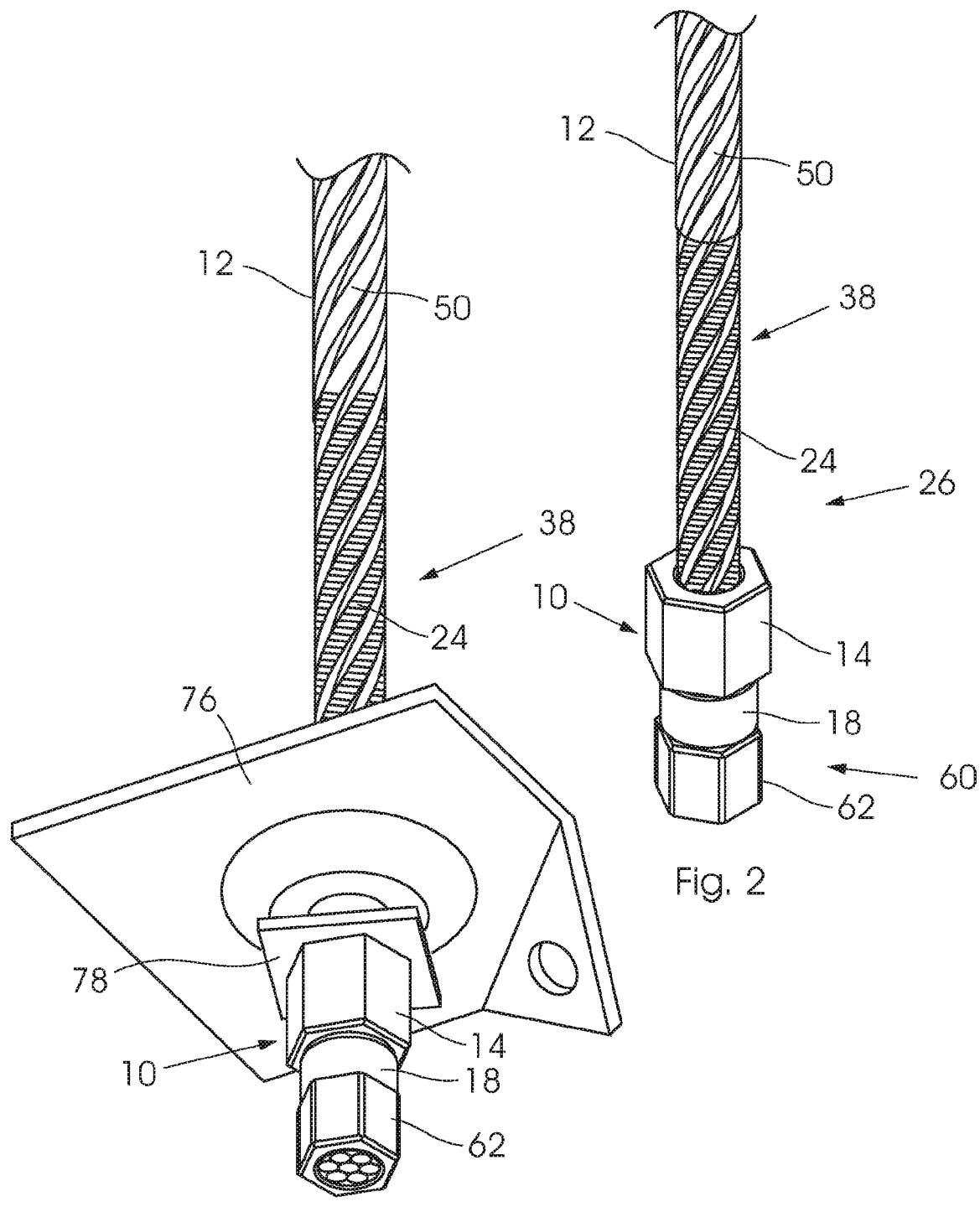
FIG. 1 shows a bottom perspective view of an assembly of a portion of a rock bolt, a bearing plate, a washer and a nut arrangement in accordance with the invention.
FIG. 2 shows a top perspective view of the rock bolt and nut arrangement of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted", "connected", "engaged" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "engaged" are not restricted to physical or mechanical connections or couplings. Additionally, the words "lower", "upper", "upward", "down" and "downward" designate directions in the drawings to which reference is made. The terminology includes the words specifically mentioned above, derivatives thereof, and words or similar import. It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Throughout this specification, including all portions thereof a first directional orientation of a thread will be taken to mean one of a right-hand thread and left-hand thread, while a second directional orientation of a thread will be taken to mean the other one of the right-hand or left-hand thread. The first and second directional orientations of thread are therefore opposite directional orientations. It will also be understood that an external thread of a first directional orientation is configured to interact with an internal thread of a first directional orientation, whereas an external thread of a second directional orientation is configured to interact with an internal thread of a second directional orientation. Furthermore, throughout this disclosure, including all parts thereof, a "first direction" will be taken to refer to a specific one of a clockwise or anticlockwise direction, when used in relation to an applied moment or torque. A "second direction" will be taken to refer to the other one of the clockwise or anticlockwise directions. The first and second directions are therefore opposite rotational directions. In the context of the present disclosure, "threads" or "threaded portions" refer to helical screw threads cut into a body to allow a screwing action between two interacting threads on two interacting bodies. The term "threads" therefore does not refer to strands, wires or the like that form a cable. Used in the context of a nut, "gripping formations" will be understood to refer to formations provided for enabling a tool, such as a socket or wrench to engage with the nut and transmit a moment or torque to said nut. Gripping formations are shown in the figures in the form of a hexagonal driving head of the known kind. It will be understood that the gripping formation may take various other shapes and forms, such as a square driving head and the like, without departing from the spirit of the invention.

Figures 3, 4, 5:
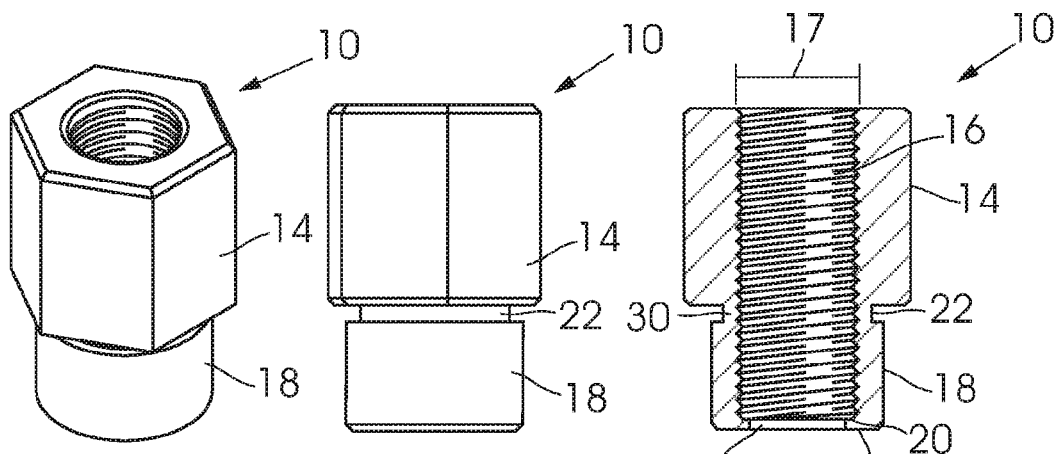
FIGS. 3-5 show a perspective view, side view and sectioned side view of a shear nut forming part of the nut arrangement of FIG. 1.
Figure 6:
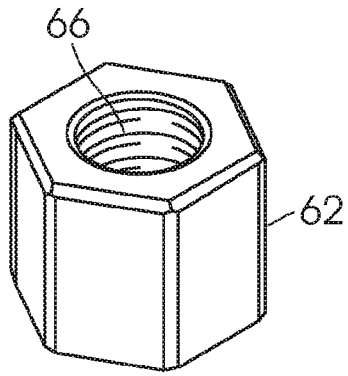
FIGS. 6-8 show a perspective view, side view and sectioned side view of a lock nut forming part of the nut arrangement of FIG. 1.
Figure 7:
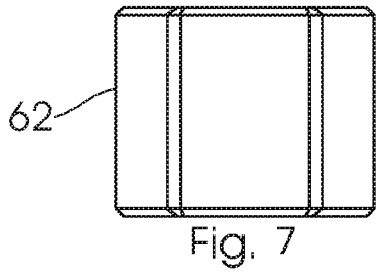
Figure 8:
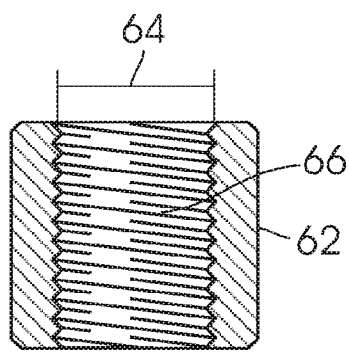
Figure 9:
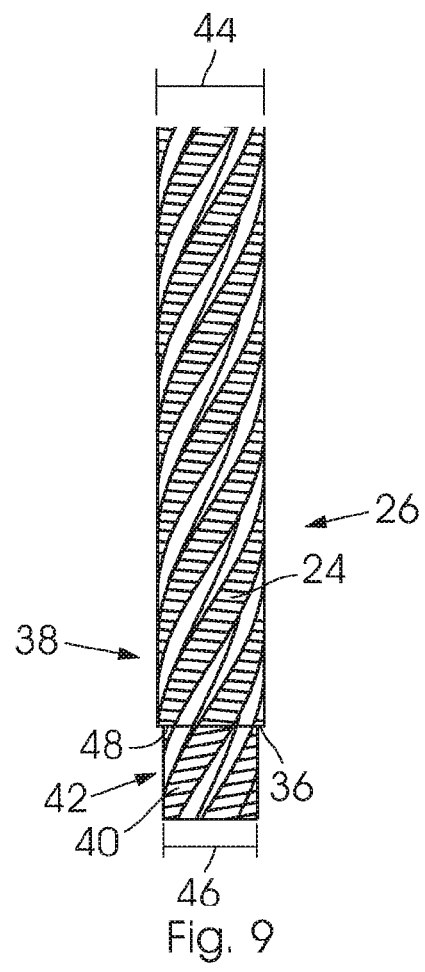
FIG. 9 shows a side view of a first end portion of the rock bolt of FIG. 1.

In the figures, like numerals indicate like features. Referring firstly to FIGS. 1 to 18, a non-limiting example of a shear nut in accordance with the invention is generally indicated by reference numeral 10. As is explained in much greater detail below, the shear nut 10 is used with a rock bolt, which is generally indicated with reference numeral 12. The shear nut 10 comprises a first portion 14 having an internal thread 16 and a second portion 18 which comprises an engagement formation 20. As is discussed in much greater detail below, the engagement formation 20 of the second portion 18 is provided and configured to interact with the rock bolt 12 in such a way, that the extent to which the second portion 18 of the shear nut 10 is allowed to advance axially along a length of the rock bolt 12, is limited by interaction between the rock bolt 12 and the engagement formation 20. The shear nut 10 furthermore comprises a connecting portion 22, which connects the first and second portions (14, 18) thereof.

The internal thread 16 of the first portion 14 interacts with a first threaded portion 24 of the rock bolt 12. The inner diameter 17 of the first portion 14 therefore corresponds to the outer diameter of the first threaded portion 24. In use, the shear nut 10 is provided on a first end region 26 of the rock bolt 12, by screwing the internal thread 16 of the first portion 14 onto the first threaded portion 24 of the rock bolt. The shear nut 10 is advanced onto the first end region 26 until the interaction between the rock bolt 12 and the engagement formation 20 inhibits further advancement of the shear nut 10 along the length of the rock bolt 12. The shear nut 10 is configured such that, when the further advancement is inhibited as mentioned, and a moment exceeding a predetermined amount, is applied to the first portion 14, the first and second portions (14, 18) are caused to become separated at the connecting portion 22. Here it will be understood that, in order for the moment to exceed the predetermined amount or size, rotation of the rock bolt 12 relative to the rock body 28 within which the bolt is installed, needs to be inhibited or resisted (at least partially). Effectively, a counter-moment is therefore created between the rock body 28 and the rock bolt 12. This is discussed in greater detail below.

It will furthermore be understood that, before the first and second portions (14, 18) have become separated, and while the further advancement of the shear nut 10 (or at least the second portion 18) is inhibited as mentioned, a moment applied to the first portion 14 which is below or smaller than the predetermined moment (but larger than a minimum moment), will cause the rock bolt 12 to rotate relative to the rock body 28, without allowing relative rotation between the shear nut 10 and the rock bolt 12 (in the absence of a counter moment applied to the rock bolt preventing such rotation). Only once the rotation of the rock bolt 12 relative to the rock body 28 is inhibited and the moment applied to the first portion 14 increases to above the predetermined threshold, will the first and second portions (14, 18) become separated.

The separation of the first and second portions (14, 18) is facilitated by the connecting portion 22. The connecting portion 22 therefore takes the form of a shearing portion. The connecting portion 22 therefore is frangible, and represents a weakened portion of the shear nut 10. In practice, the connecting portion 22 is formed by a portion of the shear nut 10, which has a wall thickness 30 which is smaller than wall thicknesses (not indicated) of the first and second portions (14, 18). The connecting portion 22 therefore takes the form of a neck portion of the shear nut 10. Since the connecting portion 22 is weaker than the remainder of the shear nut 10, the connecting portion 22 shears when the predetermined moment is applied as aforementioned. The dimensions of the connecting portion 22 can be specifically determined and accurately controlled to ensure separation at a desirable predetermined moment.

After the first and second portions (14, 18) have become separated, the first portion 14 is again allowed to rotate relative to the rock bolt 12 when a moment is applied thereto (which moment doesn't necessarily have to exceed the predetermined moment), and therefore, interaction between the internal thread 16 of the first portion 14 and the first threaded portion 24 of the rock bolt 12, causes the first portion 14 to advance axially along the first threaded portion. Both the connecting portion 22 and the second body 18 are substantially cylindrical and are arranged concentrically. As mentioned, a diameter of the connecting portion 22 is smaller than that of the second portion. An opening or hole extends through the first portion 14, through the connecting portion 22 and at least partially through the second portion 18. The internal thread 16 of the first portion 14 is formed on an inner surface of the opening. In the embodiment shown, the internal thread 16 extends from the first portion 14, through the connecting portion 22 and into the second portion. The internal thread 16 is continuous along its whole length. Therefore, the whole of the first portion 14 may be received onto the first threaded portion 24 of the rock bolt 12. So too is the whole of the connecting portion 22, and at least a part of the second portion, received onto or over the first threaded portion 24. Before the first and second portions (14, 18) have become separated, the first, connecting and second portions (14, 22, 18) are formed integrally, and so, the shear nut 10 is made up of one integral part.

The engaging formation 20 takes the form of a shoulder formed towards an operative trailing end 32 of the second portion 18. The shoulder formation is substantially disc-shaped and defines an opening 34 there through. The diameter of opening 34 is smaller than an outer diameter of the threaded portion 24 of the rock bolt 12, and therefore, engaging formation (or shoulder) 20 cannot pass over the first threaded portion 24. Interaction between the engagement formation 20 and the rock bolt 12, occurs when the shoulder makes contact with or abuts against an end 36 of the first threaded portion 24.

Since the shoulder cannot pass over or beyond the end 36 of the first threaded portion 24, the first portion 14 constitutes an operative leading portion of the shear nut 10 whereas the second portion 18 constitutes an operative trailing portion thereof. A gripping formation is formed on an outer surface of the first portion. The outer diameter of the second portion 18 (and therefore also the diameter of the connecting portion 22) is smaller than an outer dimension of any portion of the gripping formation. This means that a tool, such as a socket, used to transmit the moment to the first portion 14, can pass axially over the second portion 18 without radial interference. The internal thread 16 of the shear nut 10, and therefore the thread of the first threaded portion 24, are configured in a first directional orientation.

It will be understood that the shear nut 10 as described herein may be used with a cable bolt of the known kind (which is not shown), without departing from the spirit and scope of the invention. Such a cable bolt comprises a main body portion with a first end which is operatively received in a hole and a second end comprising a threaded portion (which is similar to the threaded portion 24 described above in relation to the bolt 12). Such a cable bolt is installed in a hole in a rock body, by filling the hole with a resin, providing a pressure or bearing plate over the threaded portion, and providing the shear nut 10 over at least partially over the threaded portion. Here the engagement formation will make contact with the end of the cable bolt, before the first portion causes tension within the bolt, or buts the bearing plate against the rock face. When a moment is applied to the first portion 14, the cable therefore starts rotating within the hole, mixing the resin, causing same to set to a point where further rotation of the cable bolt is inhibited. Consequently, the moment now exceeds the predetermined moment, causing the first and second portions (14, 18) to become separated. The first portion is now further tightened until a correct tension is achieved within the cable bolt.

However, the rock bolt 12 as shown in the figures, departs from rock bolts of the known kind, in that its first end region 26 comprises, in addition to the first threaded portion 24 (which is formed on a first body portion 38), a second body portion 40, comprising a second threaded portion 42. The second body portion 42 extends from, and axially away from, the end 36 of the first threaded portion 24 and therefore the first body portion 38.

The first body portion 38 has a first outer diameter 44, while the second body portion 40 has a second outer diameter 46. The first outer diameter 44 exceeds the second diameter 46. As mentioned before, the threads of the first threaded portion 24 have a first directional orientation. The threads of the second threaded portion 42 have a second directional orientation. A transition between the first and second body portions (38, 40) (at the end 36) defines a shoulder 48. The rock bolt 12 also comprises a main body 50 portion which extends in an axial direction away from the first end region 26 and terminates in a second end 52.

The diameter of the opening 34 exceeds the second outer diameter 46. The shear nut 10 can therefore be advanced over the second threaded portion 42 of the rock bolt 12 without interference therewith.

When used with the rock bolt 12, the shear nut 10 forms part of a nut arrangement 60. The nut arrangement 60 comprises a first portion or nut (here taking the form of the shear nut 10) and a second portion or nut, in the form of a lock nut 62, which can be configured in a locked configuration relative to the bolt. The lock nut 62 has an inner diameter 64 which is smaller than the inner diameter 17 of the first portion 14 of the shear nut 10. The lock nut 62 comprises an internal threaded portion 66, having threads configured in the second directional orientation. The inner diameter 64 of the lock nut 62 is such as to correspond to the outer diameter 46 if the second threaded portion 42, so that the internal threaded portion 66 of the lock nut 62 operatively interacts with the threads of the second threaded portion 42 of the rock bolt 12.

A gripping formation is formed on an outer surface of the lock nut 62. The gripping formation is provided for enabling a tool, such as a socket or wrench (not shown) to engage with the lock nut 62 and transmit a moment to the lock nut. Initially, this moment is used in the course of threading the lock nut onto the second threaded portion 42 of the rock bolt 12. As will be described in more detail below, the moment applied to the lock nut 62, in some cases takes the form of a counter moment. The size of the gripping formation of the lock nut 62 is smaller than that of the first portion 14 of the shear nut 10, so that the key used to tighten the shear nut 10 can be received axially over the lock nut 62 without interference, if required. In use, the extent to which the lock nut 62 can be received onto the second threaded portion 42 is limited by the shoulder 48, or by the trailing end 32 of the shear nut 10.

Figure 20:
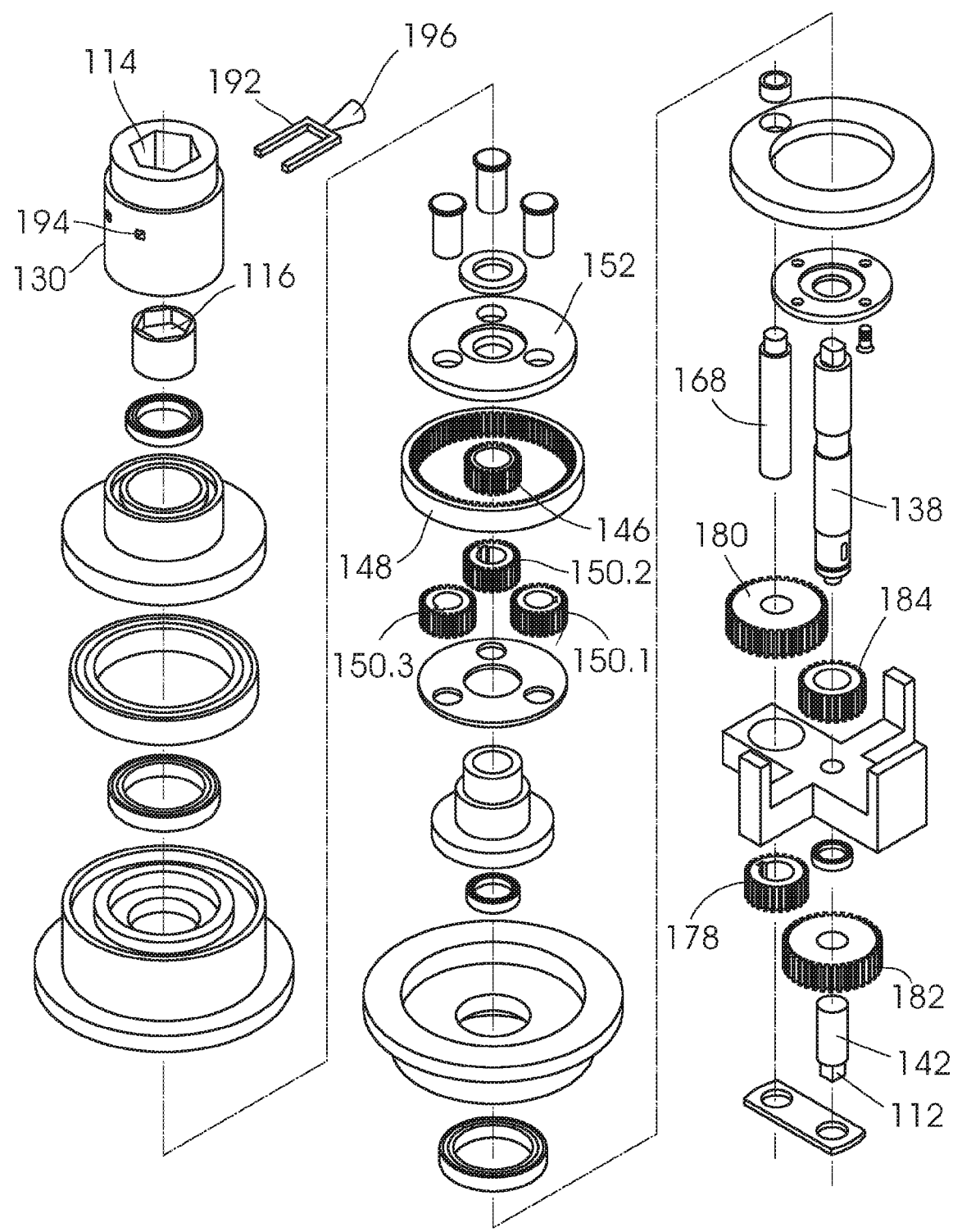

A further example embodiment of the lock nut is shown in FIGS. 19 to 22 and designated by reference numeral 300. It will be understood that, throughout the remainder of this specification, a reference to the lock nut 62 will be taken to include a reference to the lock nut 300, and vice versa, unless specifically stated otherwise. The lock nut 300 represents an improvement and a further development over the lock nut 62, as will become apparent from what follows. Also, the lock nut 300 facilitates further functionality, as will be discussed below.

The lock nut 300 comprises an inner portion 302, which has a substantially cylindrical outer surface 304. The inner portion has an internal thread on an inner diameter 306 thereof. Again, the threads of the inner portion 302 are configured in the second directional orientation. The inner diameter 306 of the inner portion 302 is such as to correspond with the outer diameter 46 of the second threaded portion 42, so that the internal threads of the inner portion 302 operatively interacts with the threads of the second threaded portion 42 of the rock bolt 12.

The lock nut 300 also comprises an outer portion 308, which has a substantially cylindrical internal opening 310 within which the inner portion 302 is received in use. The dimensions of the internal opening 310 and the inner portion 302 are such that the inner portion 302 is received snugly within the internal opening 310, but such that relative rotational displacement between the inner portion 302 and the outer portion 308 would be possible. The outer portion 308 furthermore comprises an outer gripping formation 312. Again, initially, a moment is exerted to the nut in the course of threading the lock nut 300 onto the second threaded portion 42 of the rock bolt 12. As will be described in more detail below, the moment applied to the lock nut 300, in some cases takes the form of a counter moment. The size of the gripping formation 312 of the lock nut 300 is smaller than that of the first portion 14 of the shear nut 10, so that the key used to tighten the shear nut can be received axially over the lock nut 300 without interference, if required.

The lock nut 300 furthermore comprises an interconnecting arrangement, which, in the embodiment shown in the figures, takes the form of a shear pin 314. The shear pin 314 extends between the inner and outer portions (302, 308), and while in position and intact, the shear pin 314 locks the inner and outer portions (302, 308) together. In such a case, the shear pin 314 facilitates the transfer of a moment from the outer portion 308 to the inner portion 302. The shear pin 314 is selected and configured to shear when a moment applied to the outer portion 308 reaches or exceeds a predetermined moment. This is discussed in more detail below. It will be appreciated that the size and/or number of shear pins 314 provided, as well as the material from which the shear pin 314 is manufactured, will impact on the predetermined moment. The shear pin 314 may extend through a hole in the outer portion 308 into a corresponding hole in the inner portion 302.

After the shear pin 314 has sheared, the moment applied to the outer portion 308 can no longer be transferred to the inner portion 302, and the inner and outer portions (302, 308) are free to rotate relative to each other. The inner portion 302 can therefore no longer be tightened further onto the rock bolt, nor can a counter moment be created through the lock nut 300.

In cases where the bolt 12 is a cable bolt, it will be appreciated that the provision of threaded portions on an end portion of the bolt, may require end portions of the cable bolt to be reinforced, thereby to inhibit slipping or relative movement of the strands. In accordance with the invention (though not illustrated in the figures), this is achieved by:

- pulling a king wire or strand (centre wire) of the cable axially from the cable, such that a length of the king wire is exposed;
- cutting a portion of the king wire to shorten the king wire (the length of the king wire is therefore now slight shorter than the overall length of the cable);
- pushing the king wire axially back into position within the cable, such that the king wire is more or less centred axially within the cable (in other words, two cylindrical openings or pockets are now formed on the axial centre line of the cable, on either side of the cable);
- welding inner surfaces of the openings formed at the ends thereby to fix the strands of the cable relative to each other.

Installation of the rock bolt 12 will now be described, using a nut arrangement 60. Here, the rock bolt 12 is a cable bolt as shown in FIGS. 16 and 17. The method of installation is initiated by drilling a blind hole 70 into the rock body 28. The blind hole 70 is charged with a two-part, unmixed resin compound. The compound is indicated by reference numeral 72 in FIGS. 16 and 17 after being mixed as described below. The rock bolt 12 is inserted into the blind hole 70, with the second end 52 leading the rock bolt 12 into the blind hole 70 until a portion of the first end region 26 protrudes out of the blind hole 70, and therefore beyond the rock face 74. A bearing plate 76 and washer 78 are advanced over the protruding part of the first end region 26.

Next the rock bolt 12 is fixed in the blind hole 70. This is achieved by advancing the shear nut 10 over the second threaded portion 42 (with the first portion 14 leading as described above) and threading the first portion 14 of the shear nut 10 onto the first threaded 24 portion of the rock bolt, until the engagement formation 20 prevents further threading of the shear nut 10 as described above.

Next, a setting moment is exerted on the first portion 14, which setting moment is below the predetermined moment which would cause the first and second portions (14, 18) to become separated. Since the shear nut 10 cannot be threaded further onto the rock bolt 12, the rock bolt 12 starts rotating within the blind hole, causing the compound to become mixed. The mixed compound 72 starts setting and starts resisting or counteracting the setting moment. This causes the setting moment to increase. When the compound 72 resists the rotation of the rock bolt 12 relative to the blind hole 70 altogether, the rock bolt 12 is, for the present purposes, considered to be set or fixed in place.

Next, a shearing moment is exerted on the first portion 14, which exceeds the predetermined moment, causing the first and second portions (14, 18) to become separated at the connecting portion 22. The connecting portion 22 therefore shears. The lock nut 62 is advanced onto the second body portion 40, by threading the lock nut 62 onto the second threaded portion 42 by rotating the lock nut in the second direction. The lock nut 62 is advanced along the second threaded portion 42 until the lock nut 62 makes contact with the trailing end 32 of the second portion 18. The lock nut 62 is now locked the in configuration or position.

A counter-moment is now exerted on the lock nut 62, while a tightening moment is exerted on the first portion 14. The counter-moment and tightening moment are in opposite directions. It will be understood that the counter-moment causes interaction between the internal threaded portion 66 of the lock nut 62 that urges the lock nut 62 towards the locked position. Simultaneously, the tightening moment causes interaction between the internal thread 16 of the first portion 14 and the first threaded portion 24 of the rock bolt 12, causing the first portion 14 to become tightened. The first portion 14 therefore presses against the washer 78 which in turn presses the bearing plate 76 against the rock face 74. Tension is now created within the rock bolt 12. Adherence between the main body portion 50, the compound 72 and the blind hole 70 prevents or at least inhibits the rock bolt 12 from being axially pulled from the blind rock body 28.

It will be understood that the counter moment reduces the extent to which the tightening moment needs to be resisted by the fixation between the rock bolt 12 and the rock body 28. Under ideal circumstances, the counter moment equals the tightening moment in size, and therefore a net moment of zero is transmitted to the rock bolt 12. This means that the extent to which the rock bolt 12 can be tensioned is not a function of the moment or torque that the fixation of the rock bolt 12 within the blind hole 70 can resist. In this way, due to the use of the lock nut 62, the first portion 14 can be tightened, and the rock bolt 12 can be tensioned, to a greater degree than it would have been, absent the lock nut 62 and the counter moment. A higher pretension load can therefore be achieved.

The invention extends to an embodiment where the rock bolt 12 is inserted into the blind hole 70 before the blind hole 70 is charged with the resin. The rock bolt 12 may be a hollow bolt to allow for the injection of the resin into the blind hole 70.

FIGS. 18.1 to 18.4 show alternative embodiments of the shear nut 10. Here, the first and second portions (14, 18) are formed from separate bodies, while the connecting portion 22 takes the form of a shear pin 22.1 extending between the first and second bodies (14, 18). The shear pin 22.1 may extend through side walls of the first and second bodies (14, 18). More than one shear pin 22.1 may be provided. In these embodiments, the first portion 18 comprises a recess 86 with a shoulder 88. A leading end 90 of the second portion 18 is received within the recess 86.

In another embodiment (not shown), the second portion may be fixed relative to the rock bolt, by an engaging formation in the form of a wedge formation pressed between the bolt and the second portion. Here the wedge formation prevents the second portion from rotating relative to the bolt. In such an embodiment, the connecting portion again takes the form of a shear pin extending between the first and second portions. The second portion may take the form of a barrel, with an external gripping formation (having a square, hexagonal, octagonal or other suitable shape) to allow a tool firmly to grip onto the gripping formation, and create a counter-moment when the first portion is tightened.

It will be appreciated that the invention may also find application where the rock bolt 12 is not of the spin-to-stall type, and where a shear nut 10 is not required. In such cases, the rock bolt 12 is fixed in the blind hole 70 by other means, such as an expansion unit provided towards the second end 52 of the rock bolt 12, which expansion unit is provided for expanding within, and gripping against inner surfaces of, the blind hole 70. In such cases, the shear nut 10 is replaced by a normal first nut (not indicated). Again the lock nut 62 is provided and a counter moment is created as discussed above, to counteract the tightening moment, which, in this case, is exerted on the first nut. Especially in cases such as discussed directly above with the use of the expansion unit, reducing or even eliminating the net moment exerted on the rock bolt 12 holds advantages, such as not exposing the expansion unit, which is best suited to counteract axial forces, unnecessarily to high moments or torques. Furthermore, in cases where the nut arrangement 60 is used with the rock bolt 12, it will be appreciated that the lock nut may be tightened into the locked position before the shearing moment is applied, and that the lock nut may be used to provide a counter moment to counteract the shearing moment.

Also, it will be appreciated that many structures other than roof bolts may benefit from receiving a nut which is tightened relative to said structure, whilst a counter moment is provided to avoid the structure having to counteract the tightening moment. In such a case, the structure will have a first end region similar to the first end region 26 of the rock bolt 12 described herein. The invention therefore extends to such applications.

The lock nut 300 is used to prevent over-tightening of the first portion 14. Initially, the counter moment is still exerted on the lock nut 300 as mentioned above, while a tightening moment is exerted on the first portion 14, which causes interaction between the internal thread 16 of the first portion 14 and the first threaded portion 24 of the rock bolt 12, thereby causing the first portion 14 to become tightened. However, the configuration is such that a desired pretention of the bolt accords with the predetermined moment required to cause the shear pin 314 to shear. Therefore, once the desired pretention is reached, the shear pin 314 will shear, and the lock nut 300 will no longer be able to be used to create a counter moment. Therefore, the first portion 14 cannot be further tightened (at least not by relying on the lock nut 300 to provide a counter moment).

Figure 43:
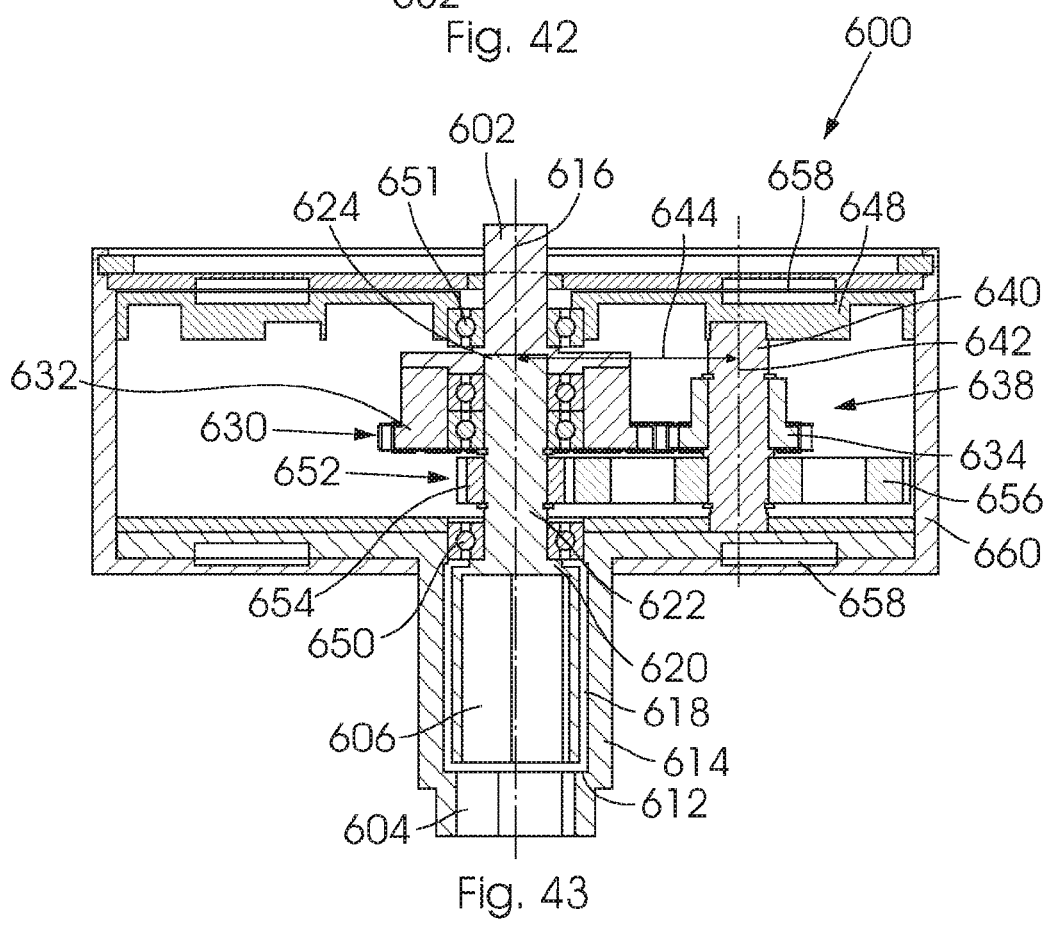
Figure 46:
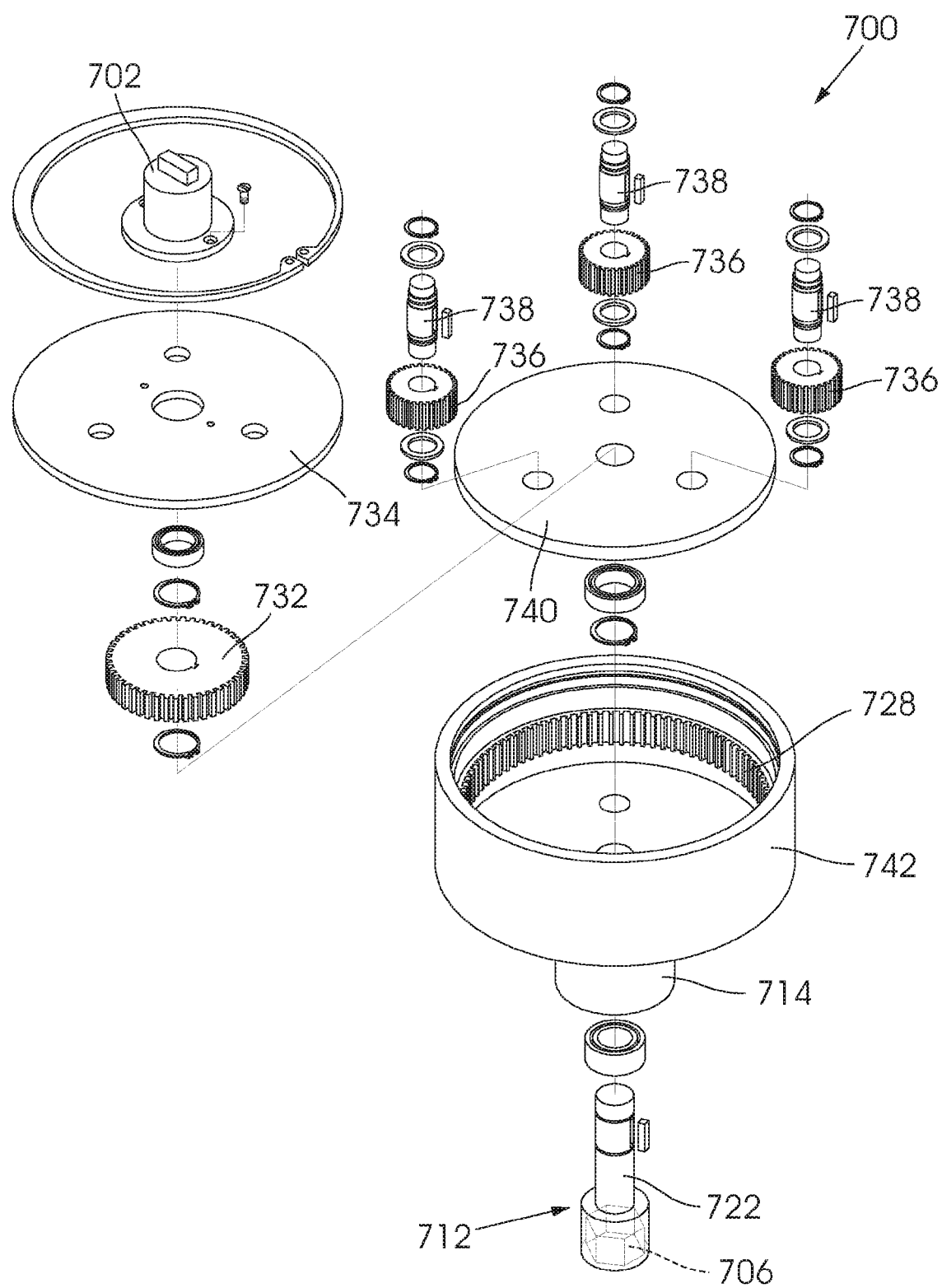
Figure 48:
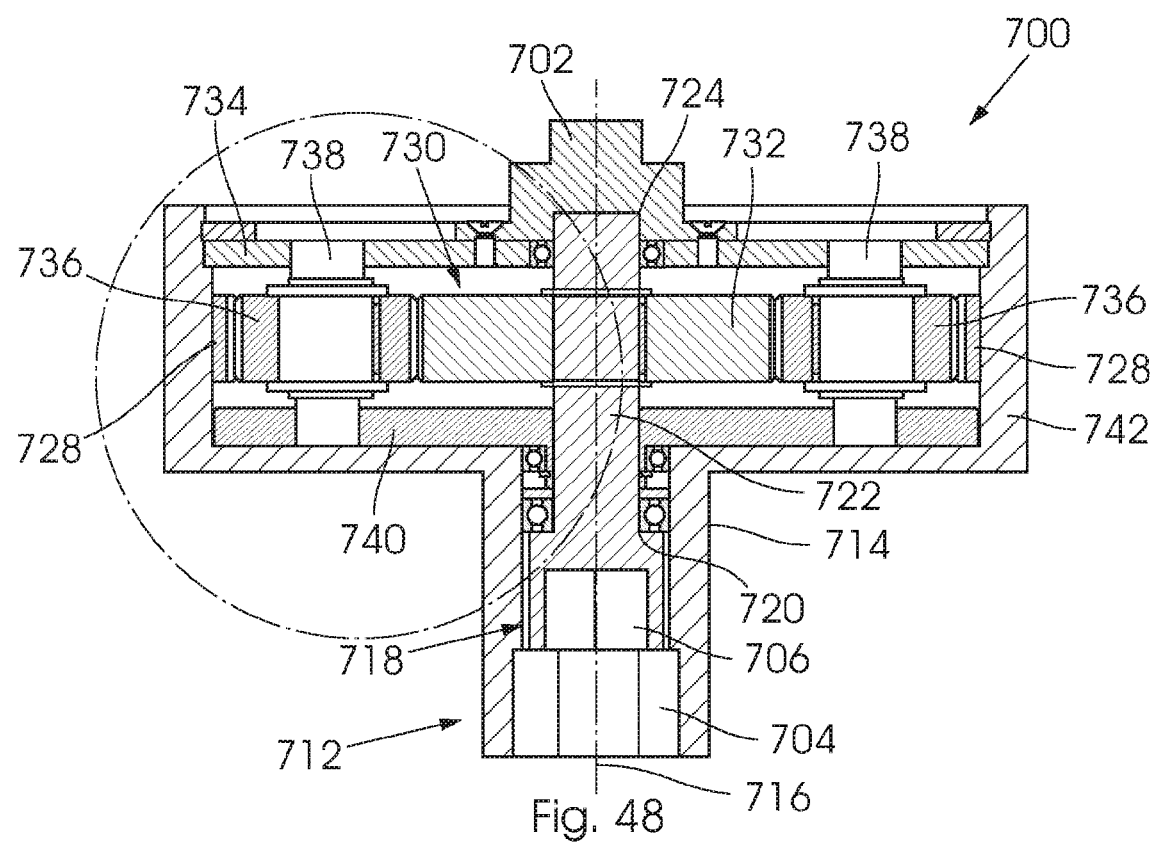
Figure 49:
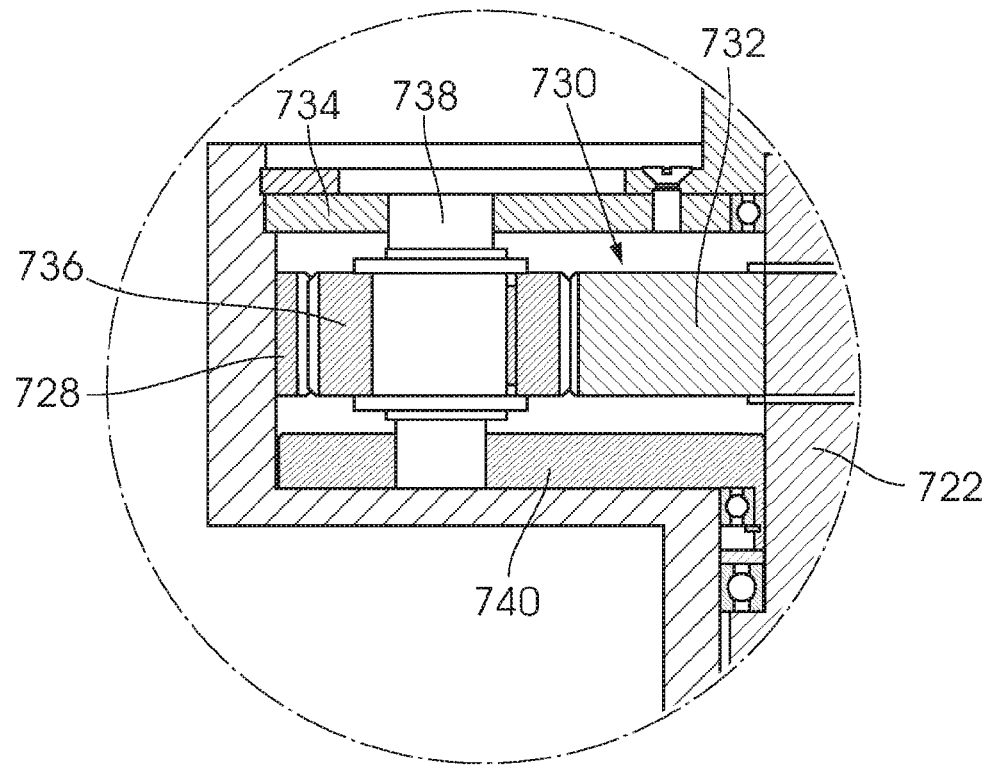
Figure 51:
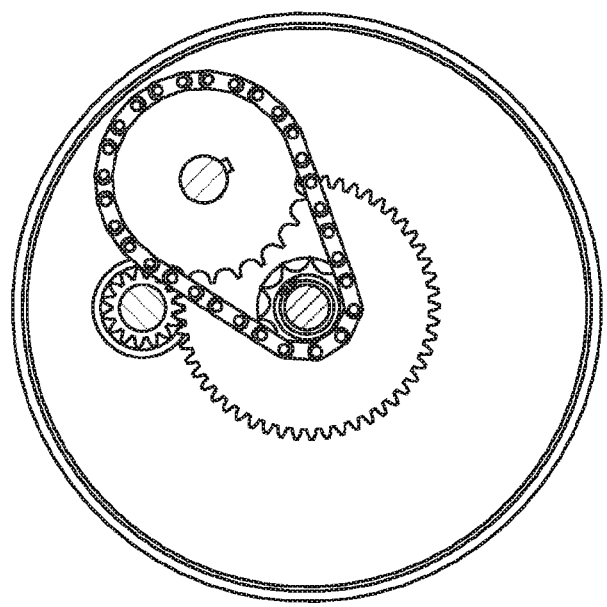
FIGS. 51-53 show various views of an alternative embodiment of the driver of FIG. 42.
Figure 52:
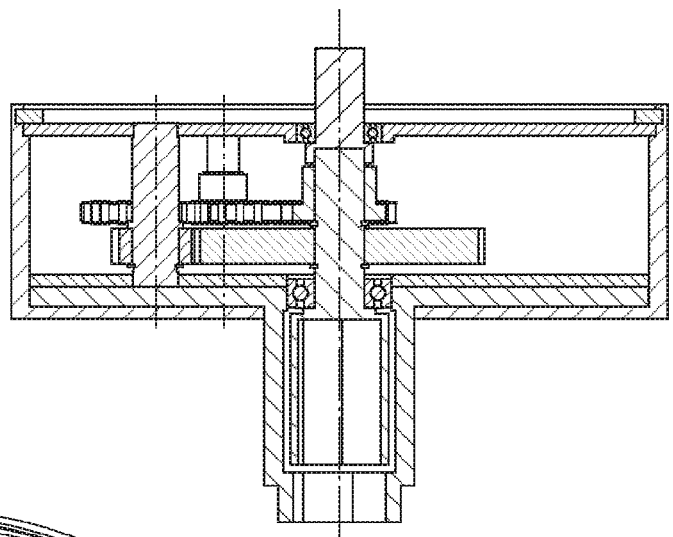
Figure 53:
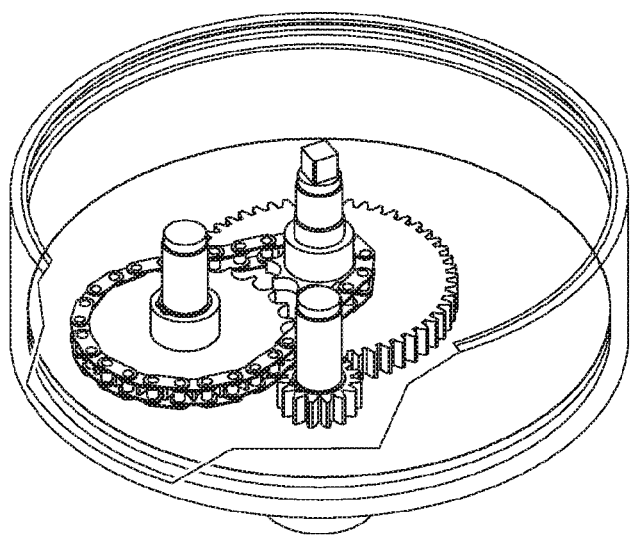
Figures 54, 55, 56:
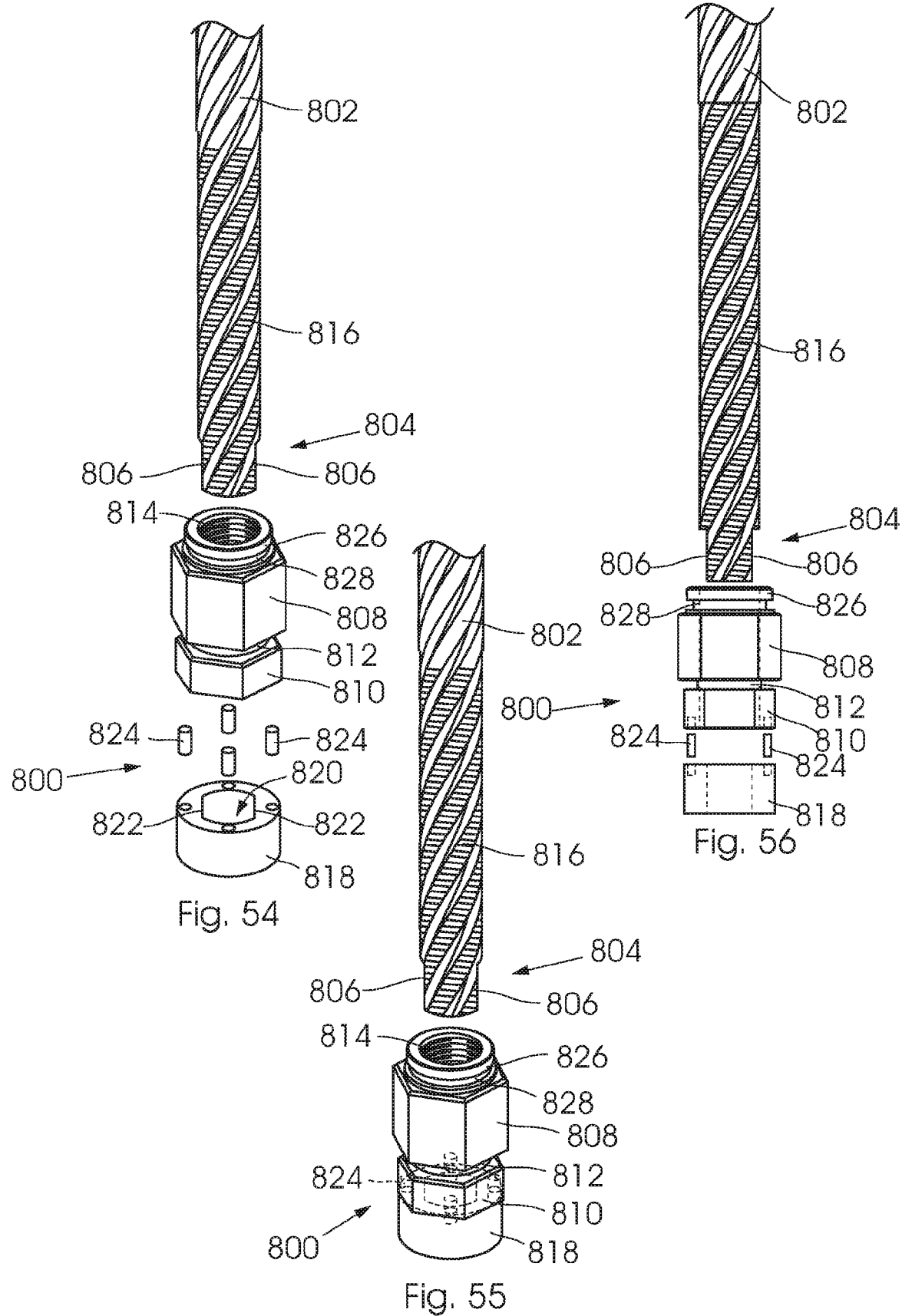
FIG. 54 shows an exploded perspective view of an alternative embodiment of a nut arrangement and a rock bolt, in accordance with the invention.
FIG. 55 shows a perspective view of the nut arrangement of FIG. 54 after being assembled and the rock bolt.
FIG. 56 shows a side view of the nut arrangement of FIG. 54 after being assembled and the rock bolt.

Referring next to FIGS. 43 to 53, a nut arrangement for a rock bolt 802 is generally indicated by reference numeral 800. The rock bolt 802 differs from rock bolts 12 discussed hereinbefore, in that an end portion 804 comprises two flat surfaces 806. The nut arrangement 800 comprises a first portion 808 and a second portion 810, connected to each other by a connecting portion 812, which is similar to the connecting portion 22. An internal thread 814 extends through the first, second and connecting portions (808, 810, 812), which is provided for engaging with an external thread 816 of the bolt 802. The nut arrangement 800 also comprises a locking portion 818 which is provided, in use, to inhibit the second portion from further displacement relative to the rock bolt 802. The locking portion is therefore provided for configuring the second portion 810 in a locked configuration.

It will be appreciated that the locking portion 818 may therefore lock the position of the second portion 810 on the rock bolt 802, thereby facilitating same (after having separated from the first portion 808) to serve as a lock nut, to create a counter-moment for fastening the first portion 808 onto the rock bolt 802. In this way, the second portion may be configured in a locked configuration. The lock portion 818 is inhibited from rotating relative to the rock bolt 802, since a hole 820 extending there through is non-circular. Specifically, in the example shown, the hole 820 has two flat surfaces 822 for interacting with the flat surfaces 806 of the rock bolt 802. This interaction inhibits relative displacement.

Shear pins 824 extend from holes in the locking portion, to suitable holes in the second portion. Therefore, after the first and second portion (808, 810) have been threaded at least partially onto the rock bolt 802, the locking portion 818 is advanced axially onto the end of the rock bolt 802 such that the locking portion 818 and the second portion 810 become engaged through the shear pins 824.

As discussed before, before resin in the hole in the rock body has become set, rotation of the rock bolt relative to the rock body is not inhibited, and the torque exerted on the first portion does not exceed the predetermined amount. Therefore, the connecting portion 812 remains intact. As the resin cures, the rotation is resisted, the torque increases and the connecting portion 812 shears. The connecting portion shears before the shear pins 824 shear. The second portion now acts as a lock nut (since rotation thereof is still inhibited by the locking portion 818) while the first portion 808 advances further along the rock bolt, so that same may become tensioned. The shear pins 824, however, only allow a predetermined amount of torque to be transferred, and therefore, over-tightening of the first portion 808 may be prevented.

Furthermore, in some examples, the first portion 808 is provided with a load indicator, in the form of a contact portion 826 which is connected thereto by a second connecting portion 828. The second connecting portion is configured to fail, crumble or buckle when a predetermined axial force is exerted, which is associated with a predetermined pretension in the rock bolt 802. This may serve as a visual indication that the pretension has been reached. It will be appreciated that the load indicator is not limited in application to the nut arrangement 800, and may also be applied with other nuts disclosed herein.

Referring next to FIGS. 59 to 61, a further nut arrangement is indicated generally by reference numeral 900. It will be appreciated that the nut arrangement 900 functions in principle the same as the nuts and nut arrangements as discussed hereinbefore, and only minor differences will be discussed. The nut arrangement 900 is used with a bolt 902 of which a centre or "king" wire 904 has been axially pulled from, or pushed deeper into, the main portion of the bolt 902, such that a centre opening 906 is formed at a second end 908 of the bolt 902. Side walls 910 of the of the bolt 902 surrounding the centre opening are welded to reinforce same. The inner surface 912 of the centre opening comprises an internal thread, which is oriented in an opposite direction to an external thread 914 formed on the second end 908.

The nut arrangement 900 again comprises a first and second part (916, 918) which are provided separately from each other, and in use, may be interconnected by shear pins 920. The second part comprises a protruding portion 922 with an external thread, configured for being received in the centre opening 906. The first part 916, again, has an internal thread for cooperating with the external thread 914 of the second end 908 of the bolt 902.

In use, the shear pins 920 may shear when a predetermined torque is reached, to allow the first part 916 to advance further along the bolt 902, while the second part 918 may remain in position, again to provide a counter-moment for the purpose of tightening the first part 916. It will be appreciated that interaction between the end 908 and the second part 918 limits the extent to which the second part 918 may advance axially along the length of the bolt 902. It will also be appreciated that the first and second parts (916, 918) comprise external gripping formations (not shown) and that the nut arrangement 900 may be configured to be used with one of the drivers as disclosed herein. The skilled person will be able to appreciate that many of the technical aspects, including physical features and attributes and methods of use, as disclosed in respect of previous example embodiments of nuts, lock nuts, and nut arrangements, may apply or be used with the nut arrangement 900.

Referring next to FIGS. 19 to 29, a non-limiting example of a driver apparatus, or just "driver" in short, in accordance with the invention is generally indicated by reference numeral 110. The driver 110 comprises an input formation 112 through which, in use, an input moment is supplied to the driver 110. The driver 110 furthermore comprises a first engagement formation 114 and a second engagement formation 116. The first engagement formation 114 is provided for operatively engaging with a first object 118, and for transmitting a first output moment or torque to the first object 118, in a first direction. The second engagement formation 116 is provided for operatively engaging a second object 120, and for transmitting a second output torque to the second object 120, in a second direction. Typically, the first object 118 comprises a bolt or a nut to be tightened or loosened by the driver. This is discussed in more detail below.

The driver 110 is characterised in that the first and second engagement formations (114, 116) are provided in axial alignment with each other. Furthermore, the first and second engagement formations (114, 116) are spaced axially relative to each other. Both the first and second engagement formations face in the same axial direction.

The first engagement formation 114 is associated with, and forms part of, a first drive arrangement 122. Similarly, the second engagement formation 116 is associated with, and forms part of, a second drive arrangement 124, while the input formation 112 is associated with an input drive arrangement. The specific configurations of the first, second and input drive arrangements (122, 124, 126), which will become more apparent from the descriptions that follow, are what enable the first and second engagement formations (114, 116) to be aligned axially, whilst exerting moments to the first and second objects (118, 120), in opposite directions. It is also the specific configurations of the first, second and input drive arrangements (122, 124, 126), which enable torque or moment multiplication, where applicable, and as discussed below.

The first and second drive arrangements (122, 124) are, directly and/or indirectly driven by the input drive arrangement 126. As will become apparent from the description below, the first, second and input drive arrangements (122, 124, 126) may be mechanically connected to form series or parallel drive paths. More than one connection may exist between the various drive arrangements.

The first engagement formation 114 is formed towards a first end 128 of a first drive body 130. The first drive body 130, and therefore also the first engagement formations 114, are arranged to rotate about a central axis 132. The first drive body may be a substantially cylindrical structure, and may be hollow so as to define an internal cavity 134. The first engagement formation 114 constitutes a first socket within which the first object 118, in the present example a first nut, is received. The first socket 114 is shaped to correspond with, and be able to engage with, the first object 118. Typically, the first socket has a hexagonal cross-sectional shape, to receive a hexagonal head of the nut. However, it will readily be appreciated that the first socket may have various other cross-sectional shapes (such as a square or an octagonal cross-sectional shape, and the like), and may be selected based on the shape of the first object 118. The first socket 114 may be open-ended on two opposing sides, to allow the second object, to protrude there through, and thereby communicate with, and become engaged with, the second engagement formation 116.

The second engagement formation 116 is formed on a first end 136 of a second drive body 138. The second drive body 138 and therefore also the second engagement formation 116 are arranged to rotate about the same central axis 132 as the first drive body 130 and first engagement formation 114. The central axis 132 is therefore a common central axis. The first and second drive bodies (130, 138) rotate about the common central axis 132 in opposite angular directions.

The second engagement formation 116 is arranged and extends at least partially within, the internal cavity 134 of the first drive body 130. The second engagement formation 116 constitutes a second socket within or by which the second object 120 (in the example shown in the figures, taking the form of a lock nut) is received in use. When the second object 120 is received within the second socket 116, the second socket 116 engages with the second object 120 so that a moment may be transferred from the second socket 116 to the second object 120.

Again, the second socket 116 typically has a hexagonal cross-sectional shape, to receive a hexagonal head of the lock nut. It will again be readily appreciated that the second socket 116 may have various other cross-sectional shapes (such as a square or an octagonal cross-sectional shape, and the like), and may be selected based on the shape of the second object 120.

It will be appreciated that the second object 120 may be no larger than the first object 118, so that the second object 120 may be able to pass through the first socket 114 without interference and be received within the second socket 116. Typically, the size of the second object 120 is smaller than that of the first object 118.

The second drive body 138 takes the form of a central shaft, which extends from the first end 136 where the first engagement formation is located, along the common central axis 132 in a direction away from the first engagement formation 114, and terminates at a second end 140.

The input formation 112 is formed on a first end of an input shaft 142. The input shaft 142 again extends along the common central axis 132 and therefore, the input formation 112 and the input shaft 142 rotate about the common central axis 132. The input shaft 142 is axially off-set from the second drive body 138 (or central shaft 138) and extends in a direction away from the second end 140 thereof. Therefore, the input formation 112 and first and second engagement formations (114, 116) are all aligned axially on the common central axis 132 and therefore all rotate about the common central axis 132.

The driver 110 furthermore comprises a planetary gear arrangement 144 which comprises of a sun gear 146, an outer ring gear 148 and at least two, but preferably three or more planet gears (indicated by reference numerals 150.1 to 150.3, and collectively designated herein by reference numeral 150).

The planet gears 150 are arranged between the sun gear 146 and the outer ring gear 148 and are provided in mesh, so as to transfer torque between the sun gear 146 and the outer ring gear 148. The sun gear 146 and outer ring gear 148 are arranged concentrically and rotate about the common central axis 132.

The planet gears 150 are arranged equidistantly on a pitch circle diameter (PCD). The planet gears 150 are carried by, and are interconnected on, a planet carrier body 152. The individual planet gears (150.1 to 150.3) are free to rotate relative to the planet carrier body 152. The planet carrier body 152 is arranged to rotate about the common central axis 132. The first drive body 130, at a second end 154 thereof, is connected to the planet carrier body 152, through a first connecting body 156. The first connecting body is fixed directly to the planet carrier body 152, on a first side 162 of the planetary gear arrangement 144.

The planet carrier body 152, first connecting body 156, the first drive body 130 and the first engagement formation 114 are therefore all interconnected and therefore all rotate together. The planet gears 150, planet carrier body 152, first connecting body 156, the first drive body 130 and the first engagement formation 114 together form the first drive arrangement 122. The planet gears 150 interact with the second and input drive arrangements (124, 126) as is discussed in more detail below.

The central shaft 138 is received through the sun gear 146 and arranged so that relative rotation between the central shaft 138 and the sun gear 146 is allowed. The sun gear is mounted to the central shaft via a bearing (not indicated). The second end 140 of the central shaft 138 is fixed to a second connecting body 160. The second connecting body 160, in turn, is fixed to the outer ring gear 148 of the planetary gear arrangement 144. The second connecting body 160 extends away from a second side 164 of the planetary gear arrangement 144. The outer ring gear 148, the second connecting body 160, the central shaft 138 and the second engagement formation 116 are therefore all fixed together, and rotate together about the common central axis 132. A moment or torque can therefore be transmitted between the outer ring gear 148 and the second engagement formation 116.

The second drive arrangement 124 is collectively made up of the outer ring gear 148, the second connecting body 160, the central shaft (or second drive body) 138 and the second engagement formation (or second socket) 116.

The input shaft 142 is supported by the second connecting body 160 in such a way that relative rotation between the input shaft 142 and the second connecting body 160 is allowed. The input shaft 142 is fixed to the second connecting body 160 through a bearing (not shown). The sun gear 146 forms part of the input drive arrangement 126 and is driven, albeit indirectly, via the input formation 112, which also forms part of the input drive arrangement 126. The input drive arrangement 126 furthermore includes a side shaft 168. The side shaft 168 extends through an opening 170 in the second connecting body 160, and is held in position relative to, the opening 170 by a bearing 172, to allow relative rotational displacement between the side shaft 168 and the second connecting body 160. The side shaft 168 is arranged parallel to, but spaced radially from, the common central axis 132. The side shaft 168 has a first and second opposing end (174 and 176 respectively) (or a first and second end region 174 and 176) with a first side shaft gear 178 fixed to the first end 174 and a second side shaft gear 180 fixed to the second end 176.

The first side shaft gear 178 is provided in mesh with an input gear 182 which is fixed to the input shaft 142. Therefore, the first side shaft gear 178 and therefore the side shaft 168 is driven by the input shaft 142 through the input gear 182. It will be appreciated that, in use, interaction between the first side shaft gear 178 and the input gear 182 may cause the side shaft 168 to exert a tangential force through the bearing 172 on the second connecting body 160, exerting a moment on the second connecting body 160 about the common central axis 132. It will be understood that the first and second side shaft gears (178, 180) are located on opposite sides of the bearing 172 supporting the side shaft 168 to the second connecting body 160.

The second side shaft gear 180 is provided in mesh with a central gear 184, which is arranged to rotate about the common central axis 132. The central gear 184 is held in position by the central shaft 138 via a bearing (not shown), so that relative rotation between the central gear 184 and the central shaft 138 is facilitated. The central shaft 138 is therefore received through the central gear 184. A third connecting body 188 is fixed between the central gear 184 and the sun gear 146, so that the central gear and the sun gear rotate together. The third connecting body 188 therefore rotates about the common central axis 132.

The input drive arrangement 126 comprises the input formation 112, the input shaft 142, the input gear 182, the first side shaft gear 178, the side shaft 168, the second side shaft gear 180, the central gear 184 the third connecting body 188 and the sun gear 146. The input drive arrangement 126 therefore drives the first and second drive arrangements (122, 124) through interaction between the sun gear 146 and the planet gears 150.

The input formation 112 takes the form of a socket or an input driving head. Typically, the input formation 112 is hexagonal, square, or the like, and may be specifically adapted to accommodate an input device (not shown) such as a wrench, a spanner, or a torqueing device, such as an electrical, pneumatic or hydraulic torqueing device.

The driver 110 further comprises a retaining mechanism 190. In use, the retaining mechanism 190 is used to attach the driver 110 to one of the first and second objects (118, 120) or a surrounding object. The retaining mechanism 190 therefore eases the handling of the driver 110 in use, ensuring that the driver 110 is supported while tightening or loosening the first object 118. The retaining mechanism attaches to the relevant object, by latching onto the object. A latch body, in the form of a first and second prong 192 is provided for this purpose. Two slots 194 are provided through a side wall of the first drive body 130 through which the two prongs 192 are received. The prongs 192 are allowed to slide within the slots 194 between a latched and unlatched configuration. The retaining formation further comprises a handle 196 for displacing the prongs 192 between the latched and unlatched configurations. The retaining formation is situated between the first and second sockets (114, 116). In use, the lock nut 120 is received by the second socket 116, after which the prongs 192 are displaced to the latched configuration, in which configuration, the prongs move in behind the lock nut 120, inhibiting the lock nut 120 from being axially displaced from the second socket 116. The two prongs 192 are spaced apart so as not to interfere with a bolt to which the lock nut is tightened. The driver is therefore supported by the retaining formation, and can hang without falling, from the lock nut 120.

It will be appreciated that the gear ratios of the various drive arrangements may be selected so as to achieve desirable torque or moment multiplication, if the need therefore exists. In other embodiments, the overall gear ratios of the various drive arrangements may be 1:1.

The length of the first engagement formation 114 may be so as to ensure that the first object 118 remains engaged, even after a certain amount of tightening, which would necessarily entail the first object 118 being displaced axially relative to the second object 120. Alternatively, (not shown) the first engagement formation 114 may be mounted so as to allow axial displacement relative to the second engagement formation 116 or to the first drive body 130. The first drive body 130 may be slidably attached to the first connecting body 156 for this purpose. However, relative rotational displacement between the first drive body 130 and the first connecting body 156 will in such cases be inhibited by the presence of a shoulder or a key (not shown). The first drive body 130 may be biased forwards to facilitate engagement with the first object 118, even when same is axially displaced away from the second object 120 in the course of being tightened.

Further alternatively, (not shown) the second engagement formation 116 may be mounted so as to allow axial displacement relative to the second drive body 138. The second engagement formation 116 may be biased forwards to facilitate engagement with the second object 120, even when the first object is axially displaced away from the second object 120 in the course of being tightened.

As is apparent from the embodiment shown in FIGS. 22 to 24, the various components may be arranged in a nested arrangement to enable the interaction between the various components mentioned herein. The various components mentioned herein may furthermore be made up of interconnected sub-components (such as the second connecting body 160, which may in practice be made up of various components (160.1 to 160.*n***) which are all interconnected. Such an interconnected assembly of sub-components is arranged so as to facilitate the transmission of a moment or torque as described herein, and may for the purposes of the present disclosure, be viewed as a single integral component.

It will be understood that the driver 110 may be specifically adapted to be used in the course of tightening a nut arrangement (118 and 120) as described herein. The first object 118 may therefore take the form of the first portion 14 of the shear nut 10 of the nut arrangement used with the rock bolt 12, whereas the second object 120 may take the form of the lock nut 62 that forms part of the nut arrangement 60 of the rock bolt 12.

Furthermore, it will be appreciated that the prongs 192 of the retaining mechanism 190 may latch onto the second portion 18 of the shear nut 10, thereby retaining the driver 110 relative to the shear rock bolt 12, even in cases where the rock bolt 12 is installed vertically in a roof of an underground mining operation. Such latching onto the rock bolt 12 may ease the use of the driver.

Furthermore, since the driver 110 creates an internal counter-moment which is exerted on the second object 120, in this case the lock nut 62, the adhesion of the rock bolt to the rock face does not need to create a counter moment, and therefore, the tightening of the first object 118 (or in this case the first portion 14 of the shear nut 10), is not dependent on the level or degree to which the rock bolt 12 is retained relative to the rock body 28. The rock bolt 12 may be tightened to a higher pretension as a result, than it would have been, absent the use of the driver 110 creating an internal counter moment. The torque multiplication of the driver 110 would in this example also provide clear advantages.

The driver may be used in cases where the second object takes the form of a gripping formation formed directly on an outer surface of the rock bolt. In such cases the second engaging formation engages with the gripping formation formed on the rock bolt in order to create the counter-moment, obviating the need to provide a lock nut for this purpose. A rock bolt configured for this use therefore forms part of the scope of the present disclosure.

The driver 110 also have various further uses outside of the tightening of roof bolts 12. For example, the driver may be used when tightening any bolt to another structure, provided the structure provides a second object 120 that can be received by the second engagement formation 160.

The second object 120 may be a nut which is fixed to a leading end of a shaft or a bolt, for example. Alternatively, the second object 120 may take the form of a recess within which to receive the second engagement formation 116. The second engagement formation 116 may, for this reason, take the form of an Allen key, a square rod, or the like.

Figure 34:
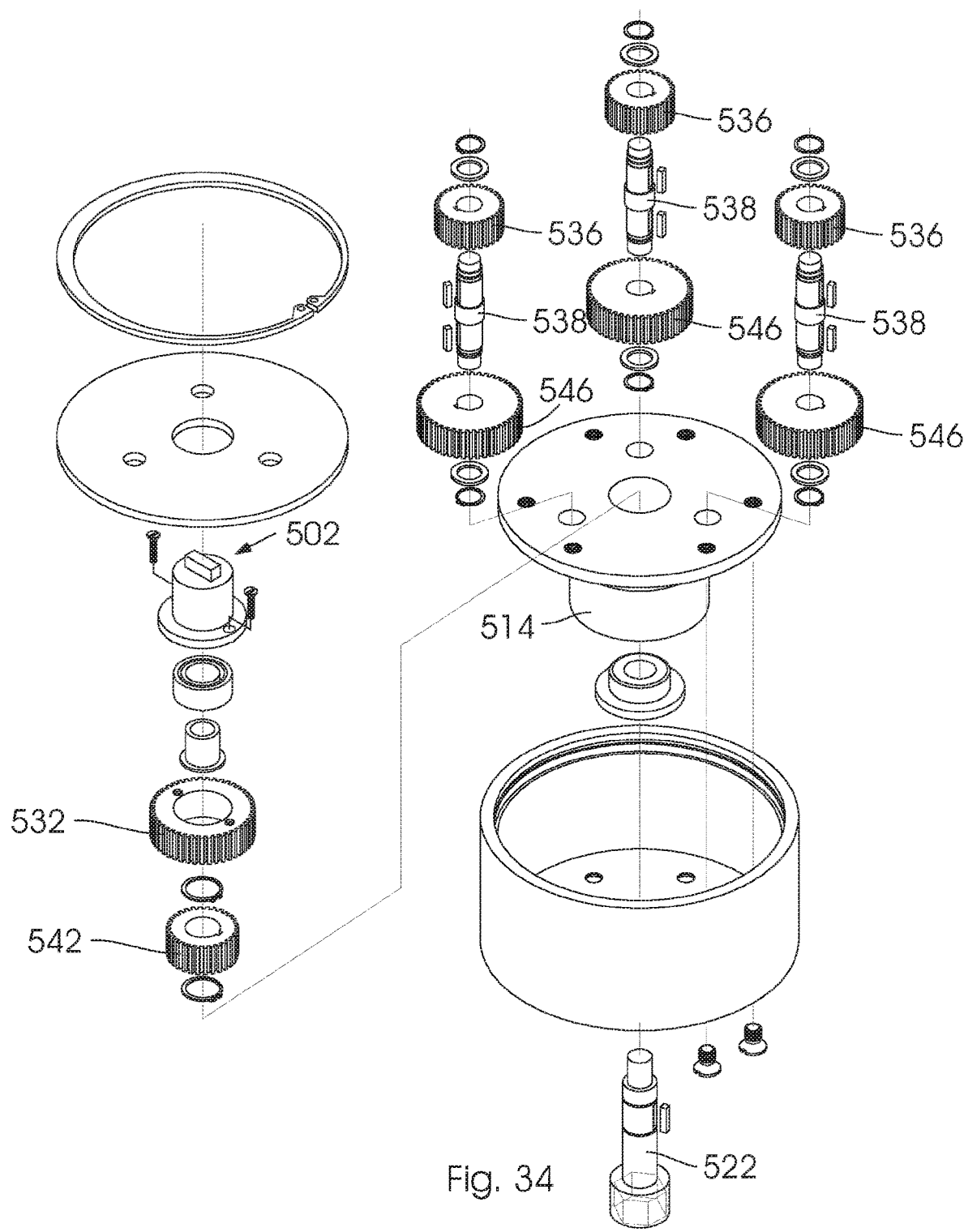
Figure 36:
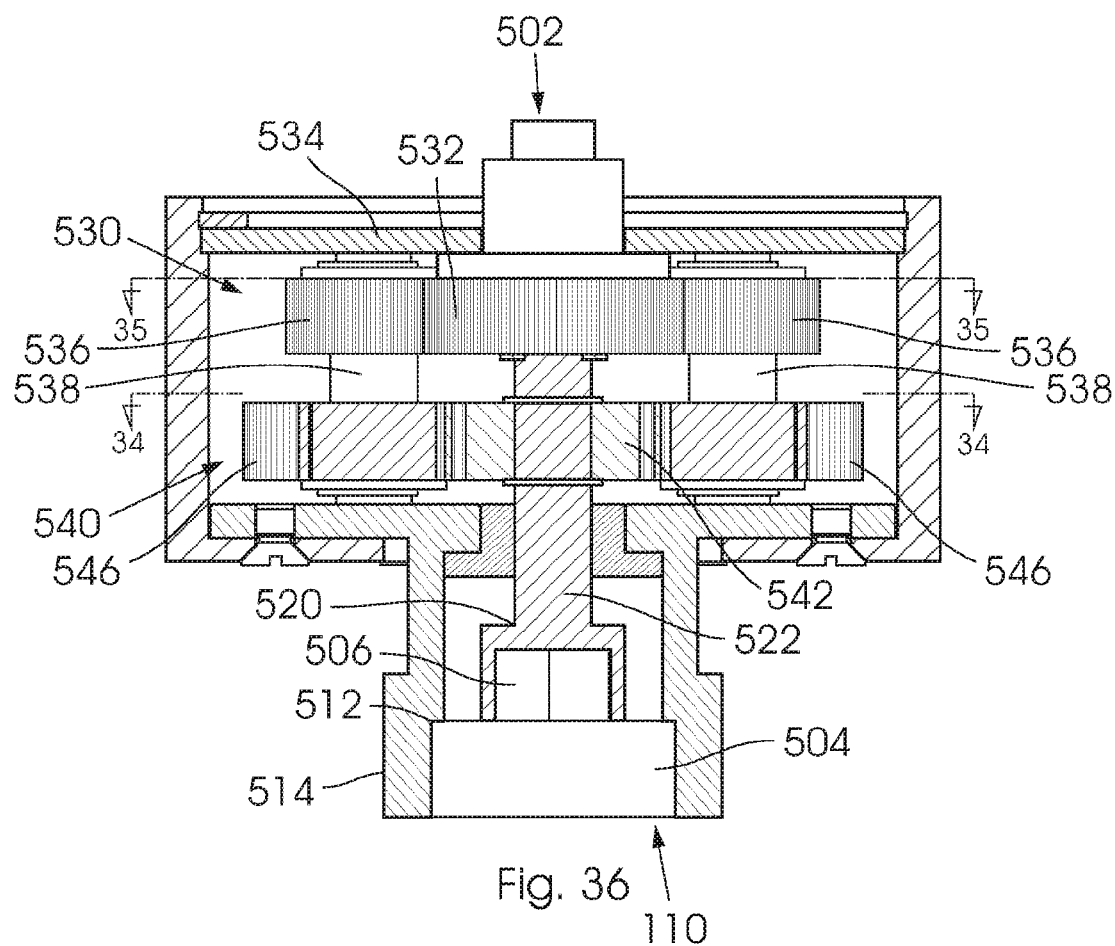
Figure 37:
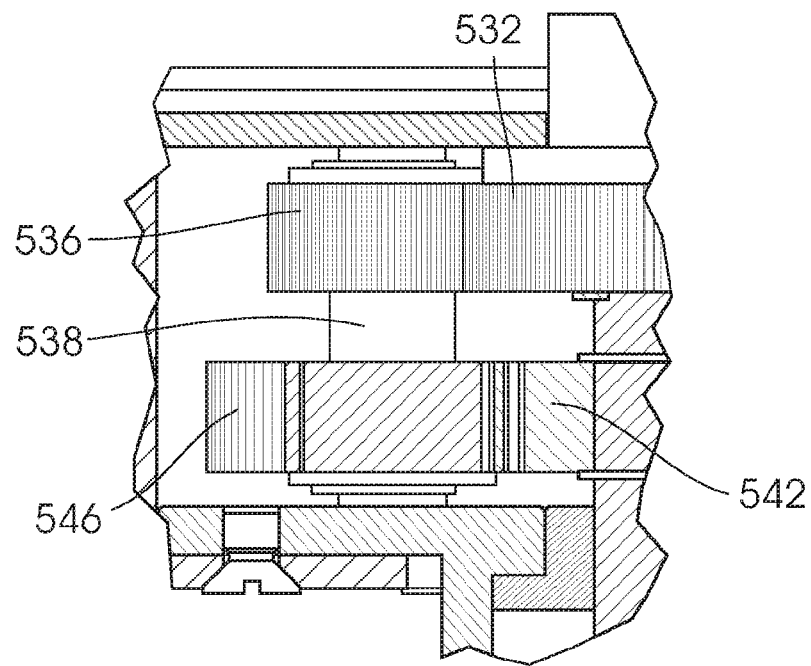
Figure 38:
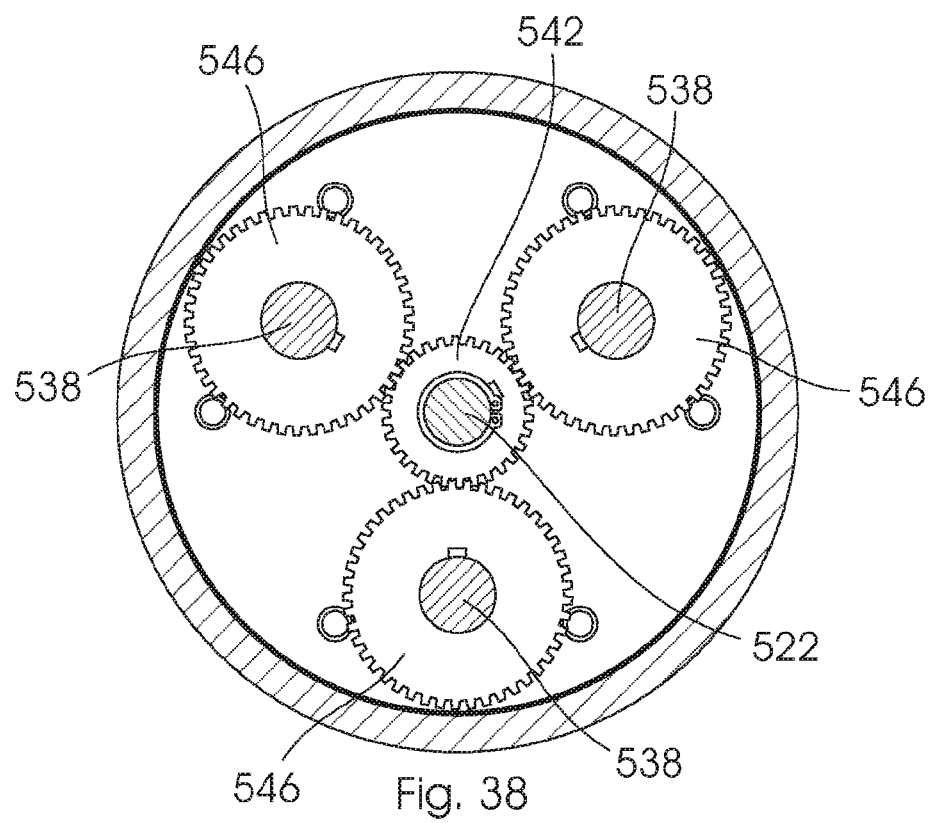
FIG. 38 shows internal details the driver apparatus of FIG. 33, and particularly, shows a sectioned view taken along the line 34-34 in FIG. 36 to reveal detail of the second planetary gear arrangement.
Figure 39:
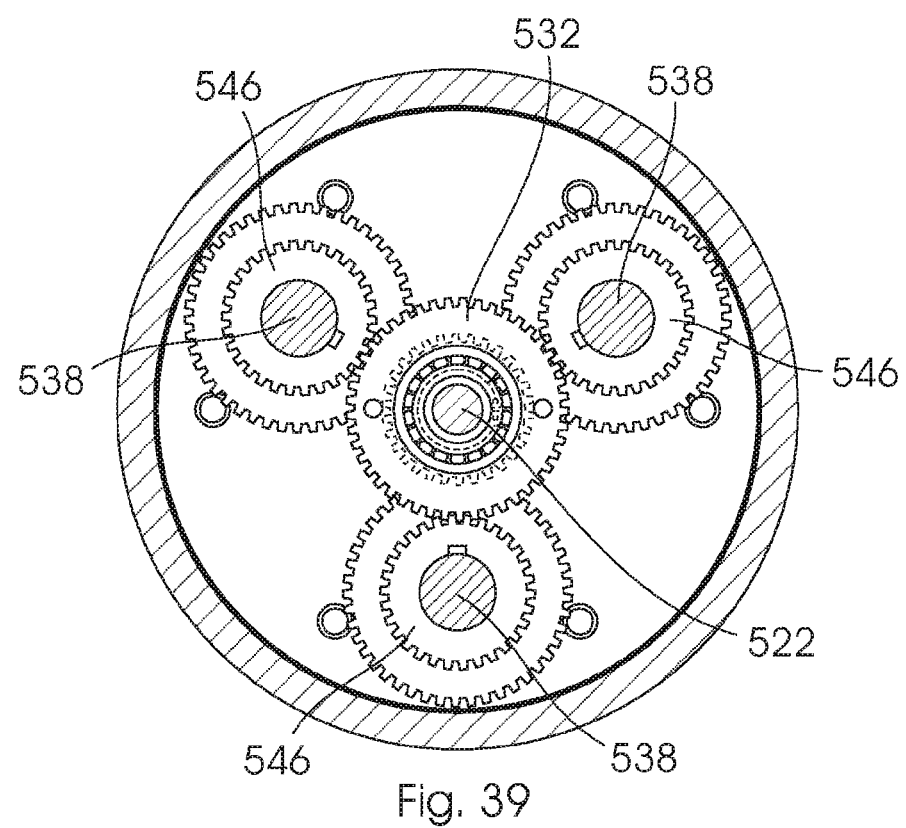
FIG. 39 shows internal details the driver apparatus of FIG. 33, and particularly, shows a sectioned view taken along the line 35-35 in FIG. 36 to reveal detail of the first planetary gear arrangement.

Referring next to FIGS. 33 to 41, a second non-limiting example of a driver apparatus, or just "driver" in short, in accordance with the invention is generally indicated by reference numeral 500. The driver 500 is provided for performing a function similar to that of the driver 110. That said, certain differences exist between the driver 500 as described below, and the driver 110.

Some components of the driver 500 are substantially similar to (in construction and function) those discussed in respect of the driver 110. For the sake of brevity, details of those components will not be discussed in full herein. The driver 500 comprises: an input formation 502 (substantially similar to 112); a first engagement formation 504 and a second engagement formation 506 (substantially similar to 114 and 116), and are also provided in axial alignment and spaced axially; a first drive body 514 (substantially similar to 138) with a first end 512; a central axis 516 (substantially similar to 132); and a second drive body 522 (substantially similar to 138) with a first end 520.

The driver 500 has a first planetary gear arrangement 530, which includes a first sun gear 532, a first planet carrier body 534 and a first planet gear 536. The first planet gear 536 typically takes the form of a first set of planet gears (which are equidistantly spaced about the first sun gear 532 on a pitch circle diameter (PCD)). Each first planet gear 536 is arranged in mesh with the first sun gear 532. It will be noted that the first planetary gear arrangement does not require an outer ring gear. The first sun gear 532 and first planet carrier body 534 are arranged to rotate about the common central axis 516. A centre point of the PCD is also arranged on the common central axis 516. The first planet carrier body 534 can rotate about the central axis 516, and relative to the first sun gear 532. Each of the first planet gears 536 are held or fixed relative to the planet carrier body 534, such that the first planet gears 536 can rotate relative to the first planet carrier 534.

Therefore, when the first sun gear 532 is rotated, the first planet gears 536, which are provided in mesh with the first sun gear 532, are caused to rotate, which in turn, causes the first planet carrier body 534 to rotate relative to the first sun gear 532. Therefore, from the point of view of the first sun gear 532, the first planet gears 536 revolve about the first sun gear 532. Each of the first planet gears 536 is associated with a distinct and separate planet shaft 538, which planet shaft 538 retains the respective first planet gear 536 relative to the first planet carrier body 534. The planet shaft 538 and first planet gear 536 are fixed together, such that they rotate together, at the same rotational speed. Therefore, the planet shaft 538 is received by the first planet carrier body 534 such that rotation of the planet shaft 538 relative to the planet carrier body 534 is permitted.

The driver 500 also has a second planetary gear arrangement 540, which includes a second sun gear 542, a second planet carrier body 544 and a second planet gear 546. The second planet gear 546 typically takes the form of a second set of planet gears (which are equidistantly spaced about the second sun gear 542 on a pitch circle diameter (PCD)). Each second planet gear 546 is arranged in mesh with the second sun gear 542. It will be noted that the second planetary gear arrangement does not require an outer ring gear. The second sun gear 542 and second planet carrier body 544 are arranged to rotate about the common central axis 516. A centre point of the PCD is also arranged on the common central axis 516. The second planet carrier body 544 can rotate about the central axis 516, and relative to the second sun gear 542. Each of the second planet gears 546 are held or fixed relative to the planet carrier body 544, such that the second planet gears 546 can rotate relative to the second planet carrier 544. Again, from the point of view of the second sun gear 542, the second planet gears 546 revolve about the second sun gear 542. However, now the second sun gear 542 is driven by the second planet gears 546.

Each of the second planet gears 546 is associated with one of the separate planet shafts 538. Therefore, each planet shaft 538 is associated with one first planet gear 536, and one second planet gear 546. Again, the planet shaft 538 retains the respective second planet gear 546 relative to the second planet carrier body 544. The planet shaft 538 and second planet gear 546 are also fixed together, such that they rotate together, at the same rotational speed. Therefore, the planet shaft 538 is also received by the second planet carrier body 544 (towards an opposite side of the planet shaft 538 to where it is received by the first planet carrier body 534) such that rotation of the planet shaft 538 relative to the planet carrier body 544 is permitted. The planet shaft 538 extends from the first planet carrier body 534 to the second planet carrier body 544. It will be appreciated that the planet shaft 538 provides a mechanical connection between the first and second planetary gear arrangements (530, 540). Typically, and as will be described in more detail below, the second planetary gear arrangement 540 is driven by the first planetary gear arrangement, and more particularly, by means of the interactions of the respective first and second planetary gear arrangements (530, 540) with the planet shaft 538.

It will further be appreciated that the first and second planet carrier bodies (534, 544) are caused to rotate at the same rotational speed, due to the interconnection with the planet shaft 538. It will also be understood that the number of planet shafts 538 are equal to the number of first planet gears 536 and the number of second planet gears 546. The size (diameter and/or number of teeth) of first planet gears 536 typically differ from the size of the second planet gears 546. Consequently, the first and second sun gears (532, 542) are also not of the same size. Therefore, the rotational speeds of the first and second sun gears (532, 542) will differ. It will be appreciated that this may advantageously cause a torque multiplication. The first and second sun gears (532, 542) are axially aligned and axially spaced from each other. The input formation 502 is directly fixed or coupled to the first sun gear 532, and therefore, drives the first sun gear 532. The first drive body 514 is directly fixed or coupled to the second planet carrier body 544. Therefore, the first engagement formation 504 is driven by the second carrier body 544. The second drive body 522 is directly fixed or coupled to the second sun gear 542, and therefore, the second engagement formation 506 is directly driven by the second sun gear 542.

As is best shown in FIG. 40, the central shaft (of the second drive body 522) extends axially through the first sun gear 532. That said, the central shaft is fixed to the first sun gear 532 by means of a bearing, such that the first sun gear 532 and central shaft are free to rotate relative to each other, without transmitting (any significant amount of) torque from one to the other. The input formation 502 and first and second engagement formations (504, 506) are all aligned axially on the common central axis 516 and therefore all rotate about the common central axis 516. The driver 500 may include a retaining mechanism 190 (substantially similar to 190).

The input formation 502 is substantially similar to 112. Other features of the driver 500, such as overall gear ratios, its use in the course of tightening nut arrangements as described herein, the creation of an internal counter-moment, its use outside of the field of roof bolts and the like, may be substantially similar to those of the driver 110 and will not be discussed in more detail.

It will be understood that the shearing of the shear pin 314 would cause the driver 500 to cease exerting a tightening moment on the first object.

It will be appreciated that the driver 500 has fewer moving parts, is less complicated and more compact than the driver 110.

Figure 42:
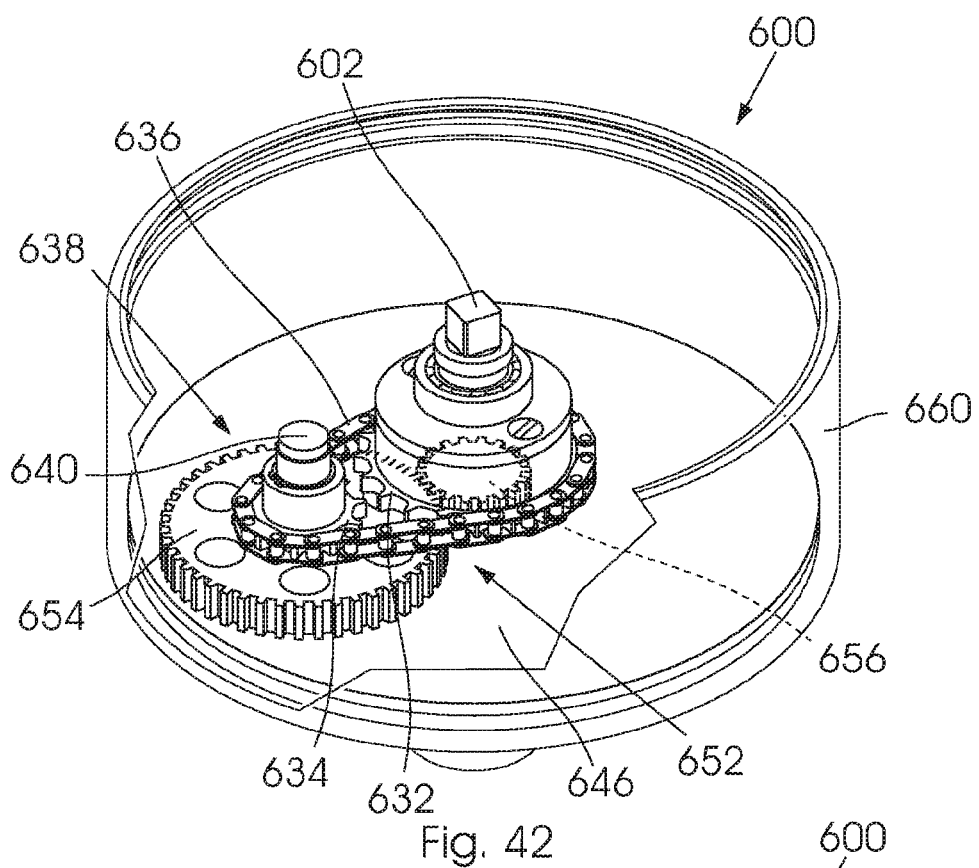

Referring next to FIGS. 42 to 45, a further non-limiting example of driver apparatus, or just "driver" in short, in accordance with a further and alternative embodiment of the invention is generally indicated by reference numeral 600. The driver 600 is provided for performing a function like that of drivers 110 and 500 described above. Again, certain distinct differences will be described below.

The driver 600 comprises: an input formation 602 (substantially similar to 502); a first engagement formation 604 (substantially similar to 504) and a second engagement formation 606 (substantially similar to 506); a first drive body 614 (substantially similar to 514) with a first end 612 (substantially similar to 512) and defining an internal cavity 618; and a central axis 616 (substantially similar to 516); a second drive body 622 (substantially similar to 522) with a first end 620 (substantially similar to 520). Again, the second drive body 622 takes the form of a central shaft, which extends from the first end 620 where the first engagement formation is located, along the common central axis 616 in a direction away from the first engagement formation 604, and terminates at a second end 624.

The driver 600 is also characterised in that the first and second engagement formations (604, 606) are provided in axial alignment with each other and are spaced axially relative to each other. The first and second engagement formations (604, 606) again face in the same axial direction.

The driver 600 comprises a first chain and sprocket arrangement 630 comprising a first sprocket 632, a second sprocket 634 and a chain 636. The chain 636 connects the first and second sprockets (632, 634) and facilitates the first sprocket 632 driving the second sprocket 634. The first sprocket 632 is directly driven through the input formation 602, and is therefore, directly coupled or fixed to the input formation 602. Therefore, the first sprocket 632 turns with the input formation 602. Since the second sprocket 634 is driven by the first sprocket 632, by means of the chain 636, the first and second sprockets (632, 634) rotate in the same direction in use. This is important, to ensure that the first and second engaging formations (604, 606) rotate in opposite directions. This is discussed more fully below. The second sprocket 634 forms part of first side-shaft arrangement 638. The first side-shaft arrangement 638 also includes a first side shaft 640. The second sprocket 634 is fixed to the first side shaft 640 such that the second sprocket 634 and the first side shaft rotate together. A key (not shown) is provided to facilitate this. The first side shaft 640 is arranged substantially parallel to the central axis 616. A first axis 642 which runs axially along the first side shaft 640 is spaced a first distance 644 from the central axis 616. The magnitude of the first distance 644 is of importance not only for practical considerations such as the sizes of the first and second sprockets (632, 634) and the length of the chain 636, but also because it has an impact on a torque exerted by the first engagement formation 604 on the first object. This is discussed more fully below. The side shaft 640 is supported in position relative to the central axis 616, by a first carrier body 646 on one end of the side shaft 640 and by a second carrier body 648 on an opposite end of the side shaft 640. The ends of the side shaft 640 are received in bearings which are supported by the first and second carrier bodies (646, 648), which bearings allow the side shaft 640 to rotate relative to the carrier bodies (646, 648). The first and second carrier bodies (646, 648) are arranged to rotate about the central axis 616. First and second carrier body bearings (650, 651) are provided for this purpose. Therefore, since the side shaft 640 is supported by the first and second carrier bodies (646, 648), in use, the side shaft 640 revolves around the central axis 616, such that a circle having a radius equal to the first distance, is described around the central axis 616, by the first axis 642.

The driver 600 furthermore comprises a first gear arrangement 652, which comprises a first gear 654 and a second gear 656. The first and second gears (654, 656) are arranged in mesh. The first gear 654 forms part of the first side-shaft arrangement 638 and is driven by the side shaft 640. Therefore, like the second sprocket 634, the first gear 654 rotates with the side shaft 640. The second sprocket 634, first gear 654 and side shaft 640 therefore all rotate about the first axis 642 and at the same rotational velocities. A key is also provided between the first gear 654 and the side shaft 640. The whole side-shaft arrangement 638 therefore revolves around the central axis 616 in use. The second gear 656 is therefore driven by the first gear 654. The second gear 656 is fixed to the central shaft (second drive body 622) and rotates with the central shaft. Therefore, the second engagement formation 606 is driven through the central shaft, by the second gear 656. The first drive body 614 is fixed to the first carrier body 646 and therefore rotates with the first carrier body 646. Low friction bearing plates 658 are arranged between the carrier bodies (646, 648) and an outer housing 660 of the driver 600. It will be appreciated that an input torque is exerted on the input formation 602, which drives the first sprocket 632. The first sprocket 632 in turn drives the second sprocket 634 through the chain 636. This simultaneously exerts a moment on the side shaft 640, causing the side-shaft arrangement 638 to revolve around the central axis 616, whilst, through the first carrier body 646, driving the first engagement formation 604 in a first direction. The second sprocket 634 drives the first gear 654 through the side shaft 640. The first gear 654 therefore rotates in the first direction. The first gear 654 drives the second gear 656 which now rotates in a second direction. The second gear drives the second engagement formation 606, also in the second direction.

The applications, and advantages of the driver 600 are similar those of the driver 500. It will be appreciated that the gear ratios of the first chain and sprocket arrangement 630 and the first gear arrangement 652, as well as the first distance 644 may be selected so as to achieve desirable torque or moment multiplication, if the need therefore exists. In other embodiments, the overall gear ratios of the various drive arrangements may be 1:1.

Figure 67:
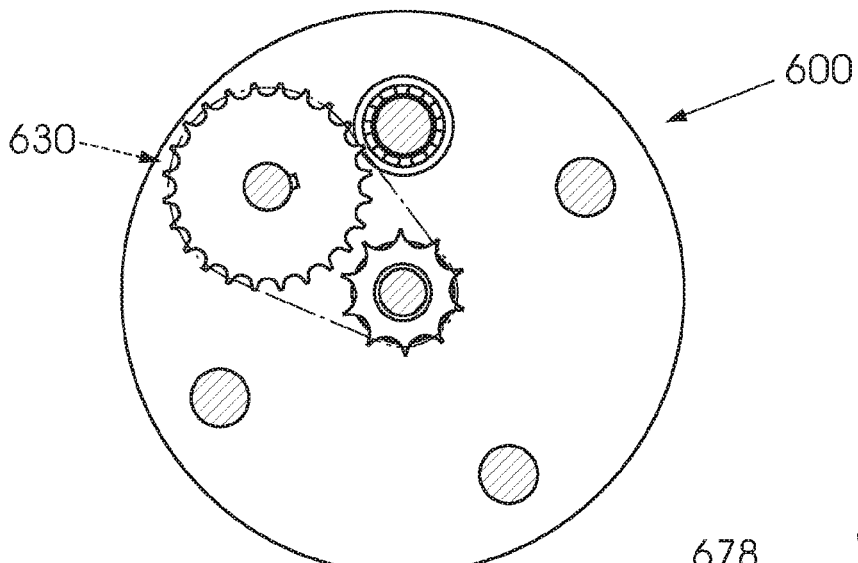
Figure 68:
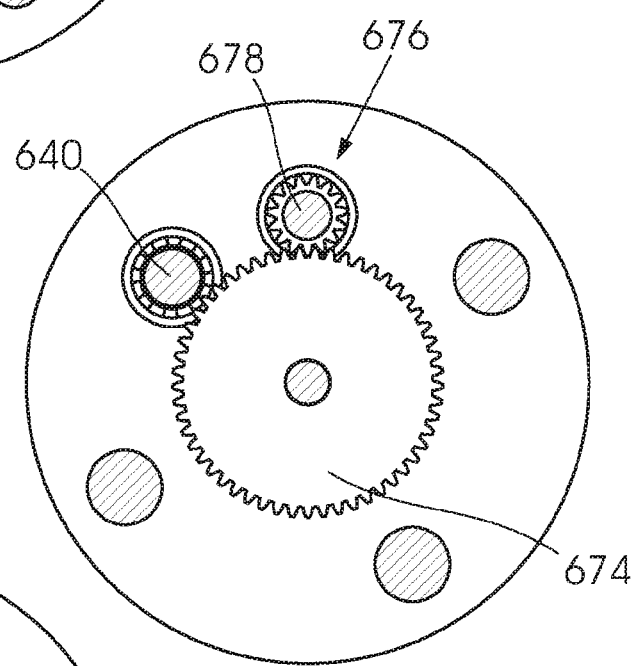
Figure 69:
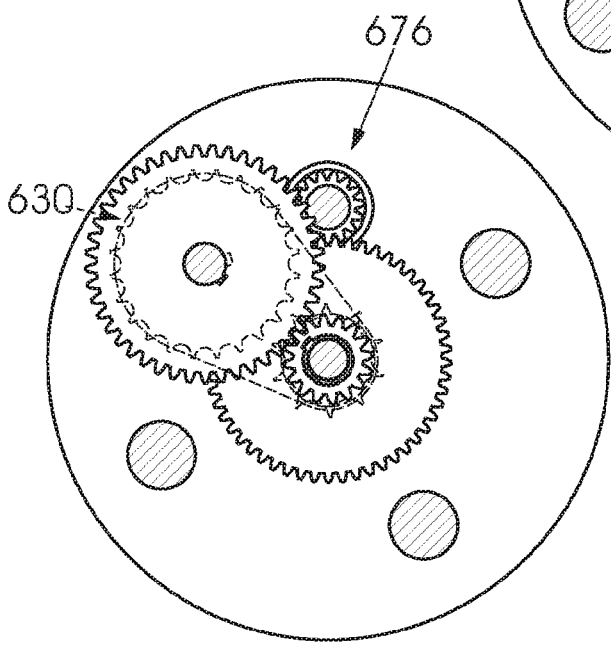

In an alternative embodiment of the driver 600, which is shown in FIGS. 65 to 69, the driver apparatus 600 includes a second gear arrangement 670, which comprises a third gear 672 and a fourth gear 674. The third and fourth gears (672, 674) are arranged in mesh. Now, the first gear 654 still forms part of the first side-shaft arrangement 638, but the second gear 656, which is still provided in mesh with the first gear 654, is associated with a second side-shaft arrangement 676, which includes a second side shaft 678. The third gear 672 is also attached to the second side shaft 678 and rotates with the second side shaft 678. Now, the fourth gear 674 is fixed to the central shaft (second drive body 622). It will be appreciated that the addition of the second gear arrangement 670 increases a torque exerted in use, by the first and/or the second engagement formations (604, 606).

Referring next to FIGS. 46 to 50, a further non-limiting example of driver apparatus, or just "driver" in short, in accordance with the invention is generally indicated by reference numeral 700. The driver 700 is provided for performing a function like that of drivers 110, 500 and 600 described above. Again, certain distinct differences will be described below.

The driver 700 comprises: an input formation 702 (substantially similar to 502); a first engagement formation 704 (substantially similar to 504) and a second engagement formation 706 (substantially similar to 506); a first drive body 714 (substantially similar to 514) with a first end 712 (substantially similar to 512) and defining an internal cavity 718; and a central axis 716 (substantially similar to 516); a second drive body 722 (substantially similar to 522) with a first end 720 (substantially similar to 520). Again, the second drive body 722 takes the form of a central shaft, which extends from the first end where the first engagement formation is located, along the common central axis 616 in a direction away from the first engagement formation and terminates at a second end 724.

The driver 700 is also characterised in that the first and second engagement formations (704, 706) are provided in axial alignment with each other and are spaced axially relative to each other. The first and second engagement formations (704, 706) again face in the same axial direction.

The driver 700 has a planetary gear arrangement 730, which includes a sun gear 732, a planet carrier body 734, a first planet gear 736 and an outer ring gear 728. The first planet gear 736 typically takes the form of a first set of planet gears (which are equidistantly spaced about the sun gear 732 on a pitch circle diameter (PCD)). Each first planet gear 736 is arranged in mesh with the sun gear 732, and also in mesh with the outer ring gear 728. The sun gear 732, planet carrier body 734 and outer ring gear 728 are arranged to rotate about the common central axis 716. A centre point of the PCD is also arranged on the common central axis 716. The planet carrier body 734 can rotate about the central axis 716, and relative to the sun gear 732 and the outer ring gear 728. Each of the first planet gears 736 are held or fixed relative to the planet carrier body 734, such that the first planet gears 736 can rotate relative to the planet carrier 734. Therefore, when the sun gear 732 is rotated, the first planet gears 736, which are provided in mesh with the sun gear 732, are caused to rotate, which in turn, causes the planet carrier body 734 to rotate relative to the sun gear 732. Therefore, from the point of view of the sun gear 732, the first planet gears 736 revolve about the sun gear 732. This also causes the outer ring gear 728 to rotate. Each of the first planet gears 736 is associated with a distinct and separate planet shaft 738, which planet shaft 738 retains the respective first planet gear 736 relative to the planet carrier body 734. The planet shaft 738 and first planet gear 736 are fixed together, such that they rotate together, at the same rotational speed. Therefore, the planet shaft 738 is received by the planet carrier body 734 such that rotation of the planet shaft 738 relative to the planet carrier body 734 is permitted. The planet shafts 738 extend from the planet carrier body 734 to a second support body 740. The second support body 740 rotates with the planet carrier body 734, due to the interconnection with the planet shaft 738. It will also be understood that the number of planet shafts 738 are equal to the number of first planet gears 736.

The input formation 702 is directly fixed or coupled to the planet carrier body 734, and therefore, drives the planet carrier body 734. The first drive body 714 is directly fixed or coupled an outer housing 742 of the driver 700. Therefore, the first engagement formation 704 is driven indirectly through the outer ring gear 728. The second drive body 722 is directly fixed or coupled to the sun gear 732, and therefore, the second engagement formation 706 is directly driven by the sun gear 732. The second drive body 722 may rotate freely within or relative to the input formation 702. The input formation 722 is coupled to, and directly drives, the planet carrier body 734. The input formation 702 and first and second engagement formations (704, 706) are all aligned axially on the common central axis 716 and therefore all rotate about the common central axis 716.

Other features of the driver 700, such as overall gear ratios, its use in the course of tightening nut arrangements as described herein, the creation of an internal counter-moment, its use outside of the field of roof bolts and the like, may be substantially similar to those of the drivers 110, 500 and 600 and will not be discussed in more detail.

It will be appreciated that, throughout this disclosure, the first and second objects referred to with reference to any one of the drivers (110, 500, 600, 700) may typically take the form of a first and second portion of a nut arrangement (such as the first portion 14 and lock nut 62 or outer portion 308; or first portion 808 and second portion 810 or may take the form of any other two formations, one being capable of being tightened, and the other capable of resisting or creating a counter moment. The drivers may typically be adapted with the specific shape and configurations of the first and second objects in mind.

It will be appreciated that the above description only provides example embodiments of the invention and that there may be many variations without departing from the spirit and/or the scope of the invention. It will easily be understood from the present application that the particular features of the present invention, as generally described and illustrated in the figures, can be arranged and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

What is claimed is:

1. A driver apparatus, comprising:
   an input formation associated with an input drive arrangement and through which an input moment or torque is supplied in use;
   a first engagement formation associated with a first drive arrangement and provided for operatively engaging with a first object, the first engagement formation configured to transmit a first output moment in a first direction to the first object; and a second engagement formation associated with a second drive arrangement and provided for operatively engaging with a second object, the second engagement formation configured to transmit a second output moment in a second direction to the second object, wherein the first and second engagement formations are aligned axially on a common central axis and spaced axially, wherein the first and second drive arrangements are driven by the input drive arrangement, so that interaction between the first, second and input drive arrangements causes the first and second engagement formations operatively to be driven in opposite directions, and wherein the driver apparatus further comprises at least a first carrier body and at least a first side shaft, which is carried or supported by the carrier body and arranged spaced from and parallel to the central axis, the first side shaft arranged to be driven, in use, directly or indirectly through the input formation, wherein a moment is exerted on the first carrier body about the central axis, by the at least first side shaft when same is driven through the input formation, the driver apparatus further comprising at least a first planetary gear arrangement comprising an outer ring gear, a first sun gear, and at least a first planet gear carried by a first planet carrier body, the arrangement such that, in use, the first planet carrier body rotates relative to the first sun gear to cause the at least first planet gear to revolve around the first sun gear.

2. A driver apparatus according to claim 1, wherein the first and second engagement formations face in the same direction, wherein the first engagement formation is fixed to or formed towards a first end of a first drive body, and the second engagement formation is fixed to or formed towards a first end of a second drive body, wherein the first and second drive bodies are arranged operatively to rotate relative to each other about the common central axis, in opposite angular directions, wherein the first drive body comprises a hollow, substantially cylindrical structure, wherein the first engagement formation constitutes a first socket which is open ended on two opposing sides thereof and within which the first object is at least partially received in use and wherein the second engagement formation is arranged at least partially within the first drive body.

3. A driver apparatus according to claim 2 wherein the first socket has one of a hexagonal and square cross-sectional shape, wherein the second engagement formation constitutes one of: a second socket having one of a hexagonal and square cross-section and within which the second object is at least partially received in use; an Allen key for engaging with a head of the second object; and a driving head.

4. A driver apparatus according to claim 2, wherein the second drive body constitutes a central shaft, wherein the second engagement formation is located towards a first end of the central shaft and wherein the central shaft extends from the second engagement formation, in a direction away from the first engagement formation.

5. A driver apparatus according to claim 1, wherein a size of the cross-section of the first engagement formation exceeds a size of the cross-section of the second engagement formation and wherein the arrangement is such that the second object is, in use, received through the first engagement formation, and brought into engagement with the second engagement formation.

6. A driver apparatus according to claim 1, wherein the input formation is fixed to, or formed integrally with, an input shaft, which is axially aligned with the first and second engagement formations and wherein the input formation takes the form of one of a socket and a driving head.

7. A driver apparatus according to claim 1, wherein internal gear ratios of the driver apparatus are selected to facilitate a torque multiplication between the input formation and at least one of the first and second engagement formations in use.

8. A driver apparatus according to claim 1, wherein the first engagement formation is connected to the first planet carrier body through a first connecting body and/or a first drive body, wherein the first engagement formation is connected to and driven by the first planet carrier body, wherein the second engagement formation is connected to the outer ring gear through a second connecting body and/or a second drive body, and wherein the second engagement formation is driven by the outer ring gear and wherein: the second connecting body constitutes the carrier body carrying or supporting the side shaft; the side shaft is associated with a first and second side shaft gear; the first side shaft gear is driven by the input formation via an input gear; and a central gear, connected to the sun gear via a third connecting body, is driven by the second side shaft gear.

* * * * *